US009225459B2

United States Patent
Oda et al.

(10) Patent No.: US 9,225,459 B2
(45) Date of Patent: Dec. 29, 2015

(54) OPTICAL TRANSMISSION SYSTEM, OPTICAL TRANSMISSION APPARATUS, SIGNAL CONDITIONING PROGRAM, AND SIGNAL CONDITIONING METHOD

(71) Applicant: FUJITSU LIMITED, Kawasaki-shi, Kanagawa (JP)

(72) Inventors: Shoichiro Oda, Fuchu (JP); Takeshi Hoshida, Kawasaki (JP); Hisao Nakashima, Kawasaki (JP); Takahito Tanimura, Berlin (DE); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 289 days.

(21) Appl. No.: 13/625,987

(22) Filed: Sep. 25, 2012

(65) Prior Publication Data

US 2013/0121691 A1 May 16, 2013

(30) Foreign Application Priority Data

Nov. 16, 2011 (JP) .................. 2011-251113

(51) Int. Cl.
*H04J 14/02* (2006.01)
*H04B 10/50* (2013.01)
*H04B 10/564* (2013.01)

(52) U.S. Cl.
CPC .......... *H04J 14/0221* (2013.01); *H04B 10/506* (2013.01); *H04B 10/564* (2013.01); *H04J 14/0254* (2013.01); *H04J 14/0212* (2013.01); *H04J 14/0271* (2013.01)

(58) Field of Classification Search
None
See application file for complete search history.

(56) References Cited

U.S. PATENT DOCUMENTS

| | | | |
|---|---|---|---|
| 6,185,022 B1 | 2/2001 | Harasawa | |
| 6,411,417 B1 * | 6/2002 | Roberts et al. | ................ 398/177 |
| 6,839,518 B1 | 1/2005 | Minamimoto et al. | |

(Continued)

FOREIGN PATENT DOCUMENTS

| | | |
|---|---|---|
| JP | 11-103287 | 4/1999 |
| JP | 2001-186107 | 7/2001 |

(Continued)

OTHER PUBLICATIONS

S. Chandrasekhar et al.; "Enabling Components for Future High-Speed Coherent Communication Systems"; Optical Fiber Communication Conference and Exposition (OFC/NFOEC), 2011 and the National Fiber Optic Engineers Conference; pp. 1-55.

(Continued)

*Primary Examiner* — Ken Vanderpuye
*Assistant Examiner* — Merlin Brito Peguero
(74) *Attorney, Agent, or Firm* — Staas & Halsey LLP

(57) ABSTRACT

An optical transmission system includes optical transmission apparatuses configured to transmit wavelength-division multiplexed light signals via lightpaths, each of a pair of optical transmission apparatuses includes a conditioning unit configured to adjust the optical intensities of channels included in the wavelength-division multiplexed light signal, and one or more first processors configured to control, based on a conditioning level notified, the conditioning unit; and a managing apparatus configured to manage the pair of the optical transmission apparatuses, the managing apparatus including one or more second processors configured to compute a conditioning level on a basis of system information for respective the pair of optical transmission apparatuses in the optical transmission system.

19 Claims, 30 Drawing Sheets

(56) References Cited

U.S. PATENT DOCUMENTS

| | | | |
|---|---|---|---|
| 2002/0154359 A1* | 10/2002 | Tsuda et al. | 359/124 |
| 2002/0181061 A1 | 12/2002 | Uda et al. | |
| 2011/0103793 A1* | 5/2011 | Collings et al. | 398/37 |
| 2012/0195592 A1* | 8/2012 | Barnard et al. | 398/48 |
| 2012/0224851 A1 | 9/2012 | Takara et al. | |
| 2012/0321306 A1* | 12/2012 | Wellbrock et al. | 398/48 |

FOREIGN PATENT DOCUMENTS

| | | |
|---|---|---|
| JP | 2002-368691 | 12/2002 |
| WO | WO 2011/030897 | 3/2011 |

OTHER PUBLICATIONS

Finisar Corporation, White Paper, "Programmable narrow-band filtering using the WaveShaper 1000E and WaveShaper 4000E", 2008.

Kristina M. Johnson, et al., "Smart Spatial Light Modulators Using Liquid Crystals on Silicon", IEEE Journal of Quantum Electronics. vol. 29. No. 2, pp. 699-714, Feb. 1993.

Glenn Baxter, et al., "Highly programmable Wavelength Selective Switch based on Liquid Crystal on Silicon switching elements", Optical Fiber Communication Conference, 2006 and the 2006 National Fiber Optic Engineers Conference. OFC 2006.

Office Action of Japanese Patent Application No. 2011-251113 issued Aug. 4, 2015.

* cited by examiner

*SAME OUTPUT PORT AS ADJACENT
CHANNEL ATT, PHASE PROFILE $ATT_{N-1}$ $ATT_0 = ATT_{N+1} = a_0$ [dB]
$Phase_0 = Phase_{N+1} = \theta_0$ [degree]

*DIFFERENT OUTPUT PORT THAN ADJACENT
CHANNEL ATT, PHASE PROFILE $ATT_{N-1}$ $ATT_0 = ATT_{N+1} = b_0$ [dB]
$Phase_0 = Phase_{N+1} = \phi_0$ [degree]

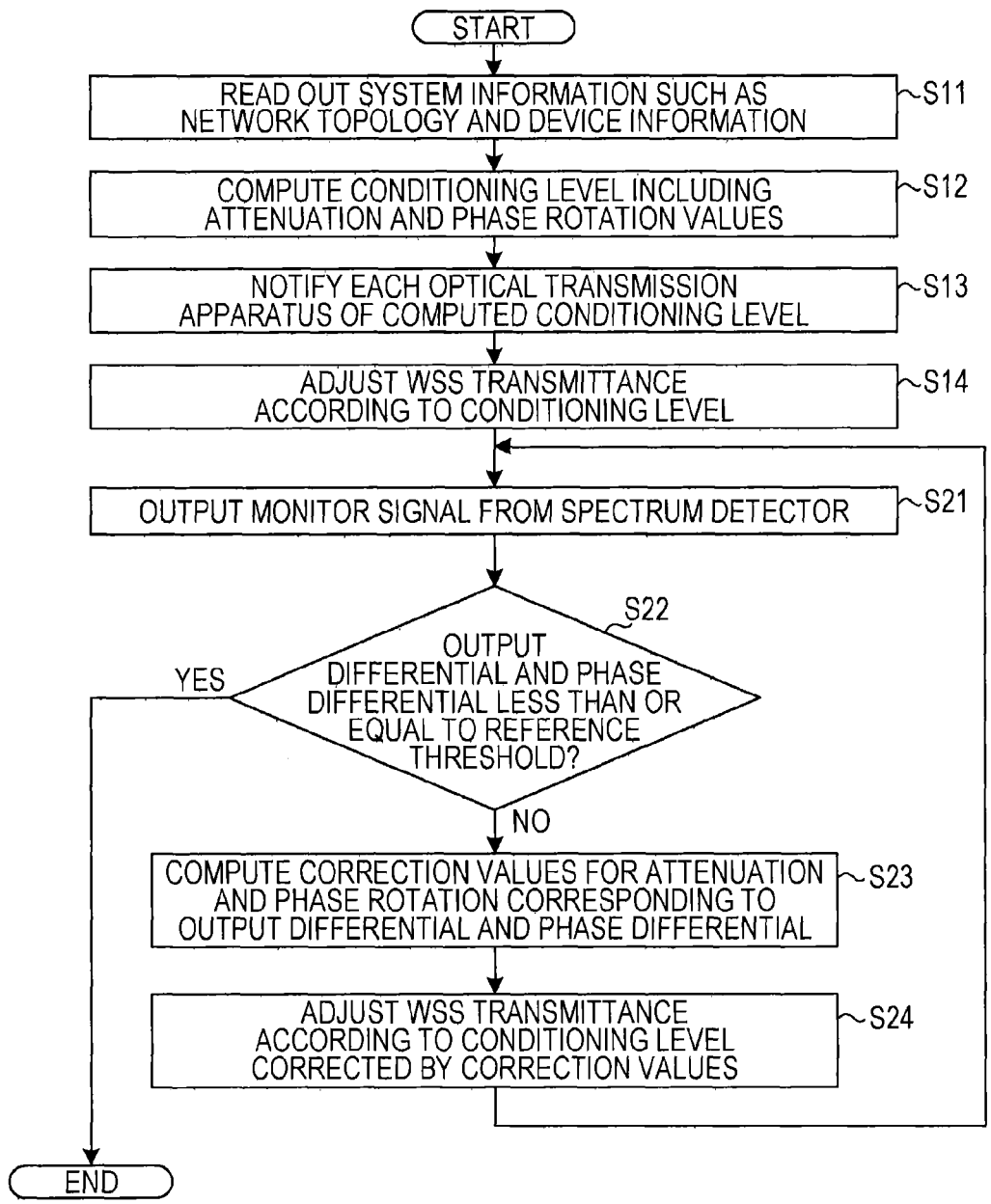

SUBCHANNEL SIGNAL #1

SUBCHANNEL SIGNAL #2
(OR REFERENCE SPECTRUM)

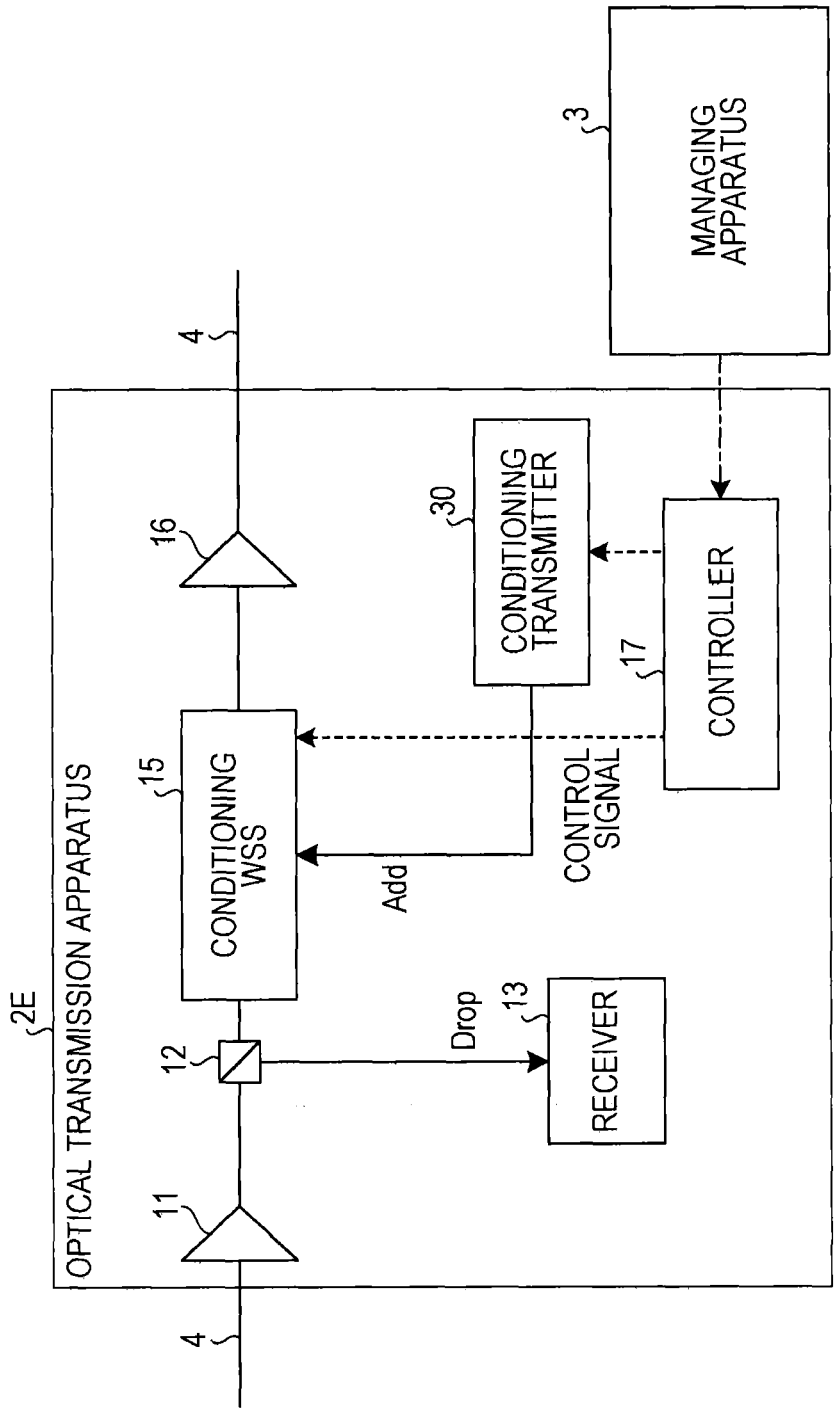

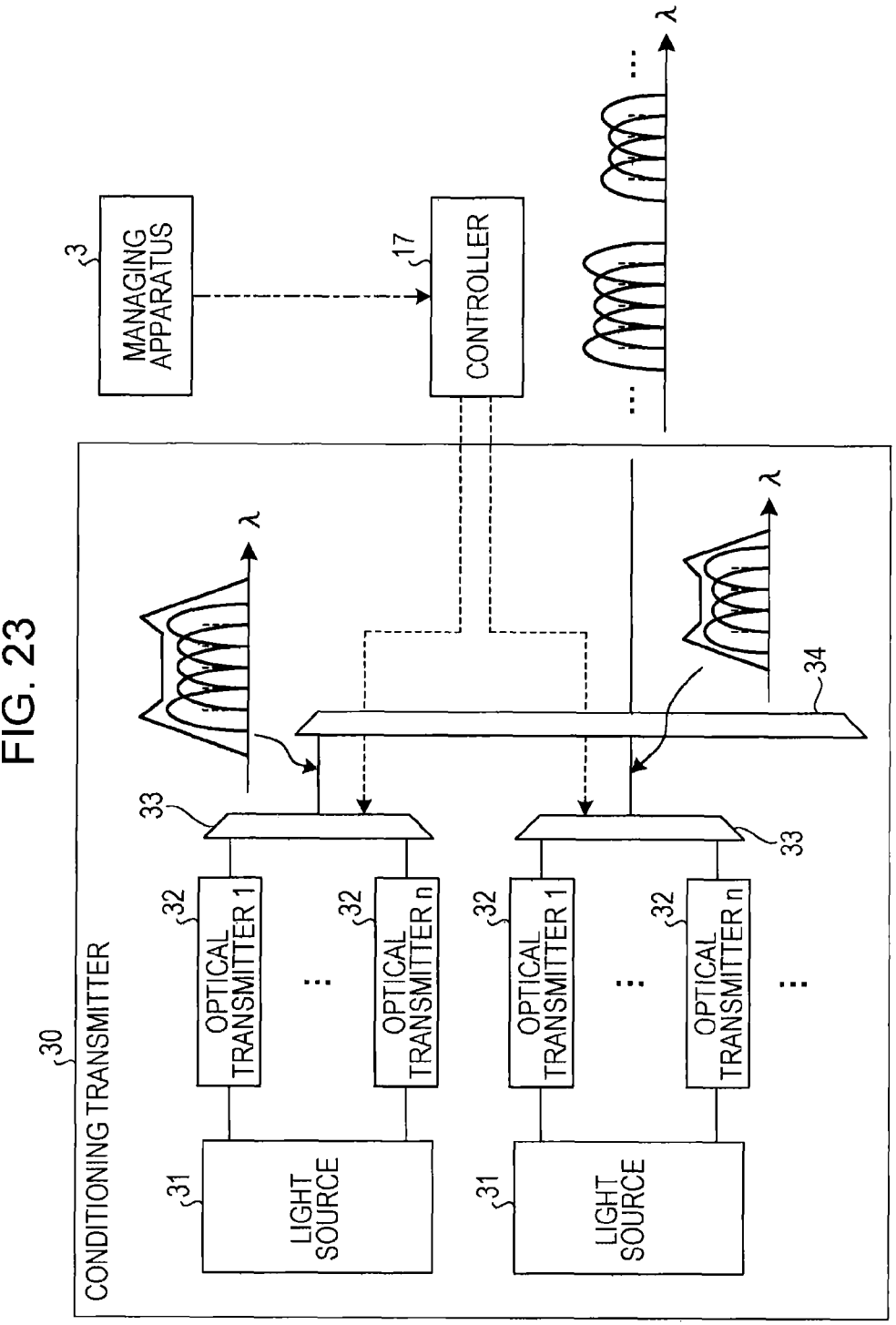

OPTICAL TRANSMISSION SYSTEM, OPTICAL TRANSMISSION APPARATUS, SIGNAL CONDITIONING PROGRAM, AND SIGNAL CONDITIONING METHOD

CROSS-REFERENCE TO RELATED APPLICATION

This application is based upon and claims the benefit of priority of the prior Japanese Patent Application No. 2011-251113, filed on Nov. 16, 2011, the entire contents of which are incorporated herein by reference.

FIELD

The embodiments discussed herein are related to an optical transmission system, an optical transmission apparatus, a signal conditioning program, and a signal conditioning method.

BACKGROUND

Orthogonal frequency-division multiplexing (OFDM) and Nyquist-WDM (wavelength-division multiplexing) are regarded as likely technologies for improving frequency utilization efficiency. In optical transmission systems where transmission rates of 100 Gbps or greater are demanded, the concept of a superchannel is adopted, in which OFDM and Nyquist-WDM are used to multiplex a plurality of subchannels which are then treated as a single signal.

In addition, there exists technology that improves the edge transmittance of an optical waveform transmitted through the band pass filter of an optical add-drop multiplexer (OADM), such technology being implemented in order to address edge deterioration in optical waveforms transmitted through such a filter. For more information, see S. Chandrasekhar and Xiang Liu, OFC2011 OMU5. S. Chandrasekhar and Xiang Liu, OFC2011 OMR5 is an example of related art.

FIG. 31 illustrates an example of signal quality variation occurring along a lightpath. When an optical transmission apparatus 201 in an optical transmission system 200 sends a superchannel signal on a lightpath 202, wavelength-dependent gain or loss in optical components such as optical amplifiers and optical filters produce signal quality variation among the subchannel signals in the superchannel signal.

The optical transmission apparatus 201 also has a built-in wavelength selective switch (WSS) 211. The WSS 211 adjusts the gain or optical power level of each subchannel signal in a superchannel signal received over the lightpath 202, and sends the adjusted superchannel signal over the lightpath 202.

FIG. 32 illustrates an example of narrowing being produced in the edge band portion of a superchannel signal. As a superchannel signal is repeatedly added and dropped on the lightpath 202, the spectral widths become narrower for subchannel signals in the edge band portion on both sides due to the transmittance properties of the WSS 211, causing worsened optical transmission quality.

SUMMARY

According to an aspect of the embodiments, an optical transmission system includes optical transmission apparatuses configured to transmit wavelength-division multiplexed light signals via lightpaths, each of a pair of optical transmission apparatuses includes a conditioning unit configured to adjust the optical intensities of channels included in the wavelength-division multiplexed light signal, and one or more first processors configured to control, based on a conditioning level notified, the conditioning unit; and a managing apparatus configured to manage the pair of the optical transmission apparatuses, the managing apparatus including one or more second processors configured to compute a conditioning level on a basis of system information for respective the pair of optical transmission apparatuses in the optical transmission system.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 is a flowchart illustrating exemplary processing operations related to a second conditioning level configuration process in an optical transmission system according to Embodiment 2.

FIG. 22 illustrates an example of an optical transmission apparatus in an optical transmission system according to Embodiment 6.

FIG. 23 illustrates an example of a conditioning transmitter in an optical transmission apparatus according to Embodiment 6.

DESCRIPTION OF EMBODIMENTS

Hereinafter, embodiments of an optical transmission system, an optical transmission apparatus, a signal conditioning program, and a signal conditioning method disclosed in this application will be described in detail on the basis of the drawings. However, the disclosed technology is not limited by these embodiments. Furthermore, the respective embodiments described hereinafter may also be combined as appropriate, insofar as such combinations are not contradictory.

Embodiment 1

Figure 1:
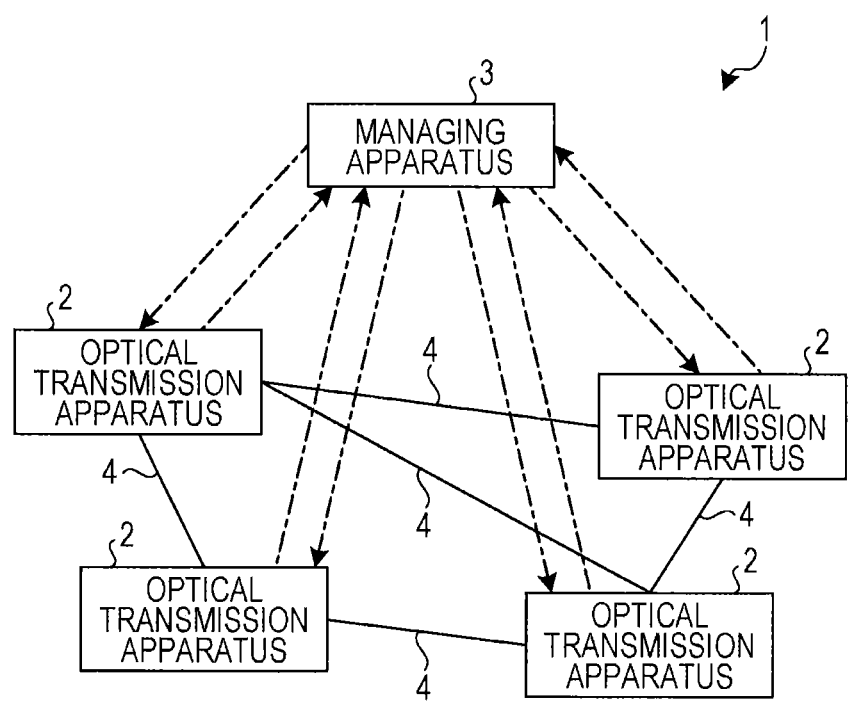
FIG. 1 illustrates an example of an optical transmission system according to Embodiment 1.

FIG. 1 illustrates an example of an optical transmission system according to Embodiment 1. The optical transmission system 1 illustrated in FIG. 1 includes a plurality of optical transmission apparatus 2 and a managing apparatus 3 configured to manage the plurality of optical transmission apparatus 2, the respective apparatus being connected by optical fiber or other lightpaths 4. Herein, the optical transmission apparatus 2 transmit wavelength-division multiplexed light over the lightpaths 4 as orthogonal frequency-division multiplexing (OFDM) superchannel signals, for example.

Figure 2:
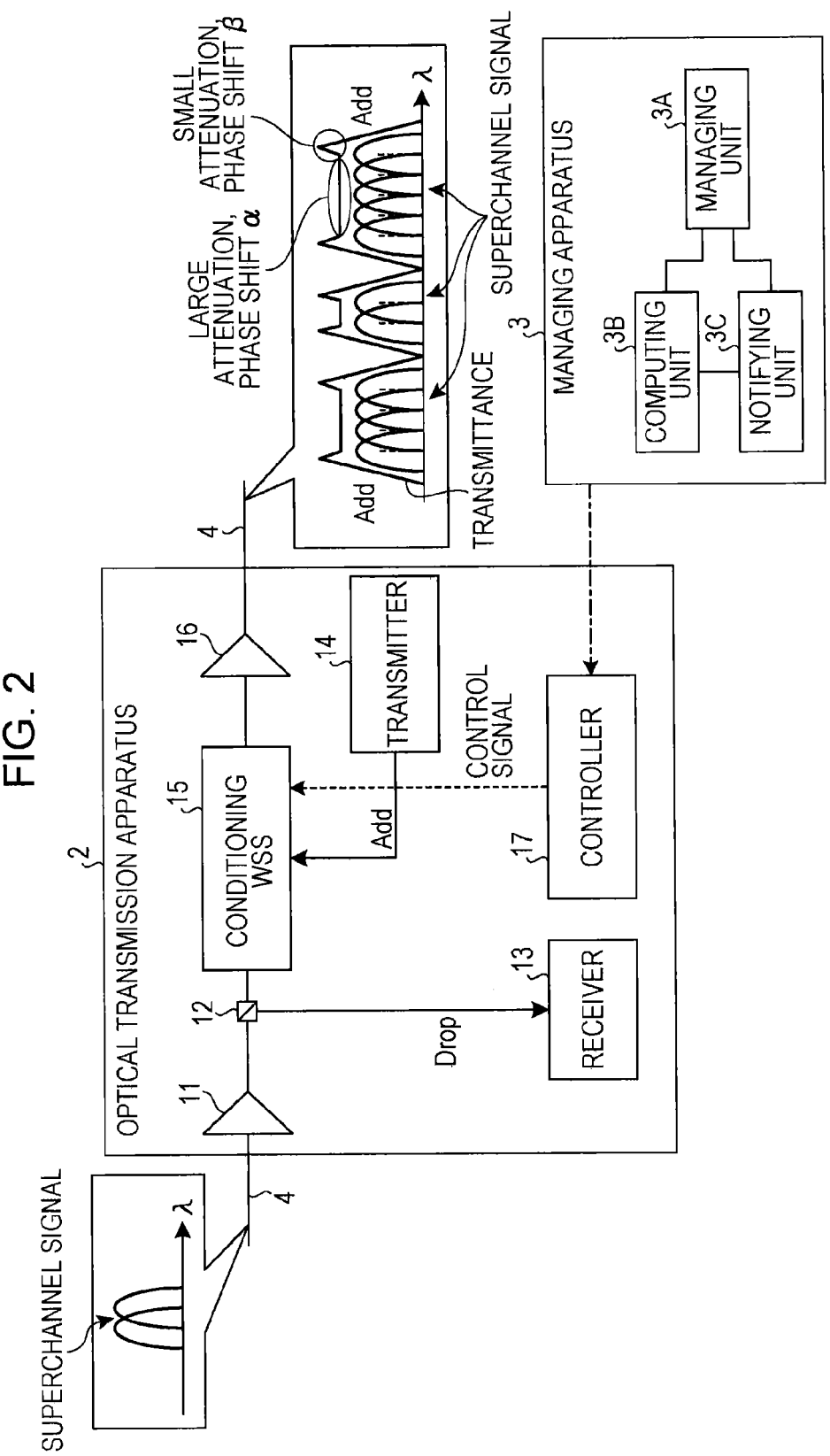
FIG. 2 illustrates an example of an optical transmission apparatus in add-drop mode in an optical transmission system according to Embodiment 1.

FIG. 2 illustrates an example of an optical transmission apparatus 2 in add-drop mode in an optical transmission system 1 according to Embodiment 1. The optical transmission apparatus 2 illustrated in FIG. 2 includes a first optical amplifier 11, an optical splitter 12, a receiver 13, a transmitter 14, a conditioning WSS 15, a second optical amplifier 16, and a controller 17. The first optical amplifier 11 amplifies a superchannel signal received via a lightpath 4. The optical splitter 12 splits the received superchannel signal. The receiver 13 functions to receive a superchannel signal that has been split (dropped) by the optical splitter 12. The transmitter 14 functions to transmit (add) a superchannel signal to the lightpath 4.

The conditioning WSS 15 is provided with functions for selectively switching among different superchannel signals according to their wavelengths, and with add functions for optically inserting (adding) a superchannel signal obtained from the transmitter 14 to a received superchannel signal. In addition, the conditioning WSS 15 adjusts the gain and optical phase rotation of each subchannel signal in the superchannel signal so as to mitigate the output differential (i.e., the optical intensity differential among subchannel signals) and the optical phase differential among subchannel signals in a received superchannel signal.

The controller 17 controls the transmittance of the conditioning WSS 15 on the basis of a conditioning level. Herein, the conditioning level includes an attenuation value by which to adjust the gain of subchannel signals in a superchannel signal, and a phase rotation value by which to adjust the optical phase of subchannel signals. The conditioning WSS 15 adjusts the gain and phase of the center frequencies of the subchannel signals, for example, with adjustments being made in units of a frequency interval that is narrower than the frequency bandwidth of a single subchannel signal. Although the conditioning WSS 15 is herein described as adjusting the gain of the center frequency of each subchannel signal for the sake of convenience, it is appreciated that such adjustment is not limited to the center frequency. Meanwhile, the second optical amplifier 16 amplifies a superchannel signal that has been adjusted (conditioned) by the conditioning WSS 15, and transmits the superchannel signal over a lightpath 4.

The managing apparatus 3 may be realized by a general-purpose personal computer or workstation, for example, and may be connected to the optical transmission apparatus 2 in the optical transmission system 1 by a local area network (LAN). The managing apparatus 3 includes a managing unit 3A, a computing unit 3B, and a notifying unit 3C. The managing unit 3A manages system information regarding the optical transmission system 1. System information refers to information regarding the operation of the optical transmission system 1, and includes topology information regarding the network connecting the optical transmission apparatus 2 in the optical transmission system 1, as well as device information regarding the optical transmission apparatus 2 in the optical transmission system 1. The device information includes settings for the conditioning WSS 15 in each optical transmission apparatus 2 as well their corresponding conditioning level, which indicates the attenuation and phase rotation equivalent to one hop.

The settings distinguish whether the WSS in an optical transmission apparatus 2 is set to cut-through mode or add-drop mode, and also whether or not the WSS is a conditioning WSS 15. Herein, add-drop mode refers to a mode set when optically inserting (adding) or optically splitting (dropping) a superchannel signal at an optical transmission apparatus 2. Cut-through mode refers to a mode set when allowing a superchannel signal to cut through as-is without optically inserting (adding) or optically splitting (dropping) a superchannel signal at an optical transmission apparatus 2.

Once an optical transmission apparatus 2 to be adjusted in the optical transmission system 1 has been identified, the computing unit 3B computes, on the basis of the system information for the optical transmission system 1, a conditioning level used to set the transmittance of the conditioning WSS 15 in that optical transmission apparatus 2. For example, on the basis of the topology information contained in the system information, the computing unit 3B may compute the number of hops, or in other words, the number of optical transmission apparatus 2 that a superchannel signal may pass through before reaching an optical transmission apparatus 2 to be adjusted. The computing unit 3B may then compute the attenuation at the optical transmission apparatus 2 to be adjusted on the basis of the computed number of hops, the settings in each optical transmission apparatus 2, and the attenuation equivalent to one hop, as expressed in equation 1. Note that equation 1 herein computes the attenuation at the hth optical transmission apparatus 2 as the conditioning level.

$$ATT_{M,h} = ATT_{ref} + J\Delta Aj_h + K\Delta Ak_h + L\Delta Al_h \text{ (where } h=1 \text{ to } n)\quad(1)$$

$ATT_{M,h}$: attenuation at optical transmission apparatus M at hth level of attenuation/phase rotation settings $ATT_{M,h}$: reference attenuation I: cut-through; number of non-conditioning WSS hops
J: cut-through; number of conditioning WSS hops
K: add-drop; number of non-conditioning WSS hops
L: add-drop; number of conditioning WSS hops
$\Delta Aj_h$: cut-through; attenuation equivalent to one non-conditioning WSS hop
$\Delta Ak_h$: add; attenuation equivalent to one conditioning WSS hop
$\Delta Al_h$: add; attenuation equivalent to one non-conditioning WSS hop The computing unit 3B may also compute the phase rotation at the optical transmission apparatus 2 to be adjusted on the basis of the number of hops before reaching the optical transmission apparatus 2 to be adjusted, the settings in each optical transmission apparatus 2, and the phase rotation equivalent to one hop, as expressed in equation 2. Note that equation 2 herein computes the phase rotation at the hth optical transmission apparatus 2 as the conditioning level.

$$Phase_{M,h} = J\Delta Pj_h + K\Delta Pk_h + L\Delta Pl_h \quad(2)$$

$Phase_{M,h}$: hth phase rotation at optical transmission apparatus M $\Delta Pj_h$: cut-through; phase rotation equivalent to one conditioning WSS hop
$\Delta Pk_h$: add; phase rotation equivalent to one conditioning WSS hop
$\Delta Pl_h$: add; phase rotation equivalent to one non-conditioning WSS hop In an optical transmission apparatus 2, the transmittance of the conditioning WSS 15 is adjusted and the subchannel signals in a superchannel signal are adjusted in the case where, for example, a new superchannel signal is optically inserted (added) to a stable superchannel signal on a lightpath 4.

Figure 3:
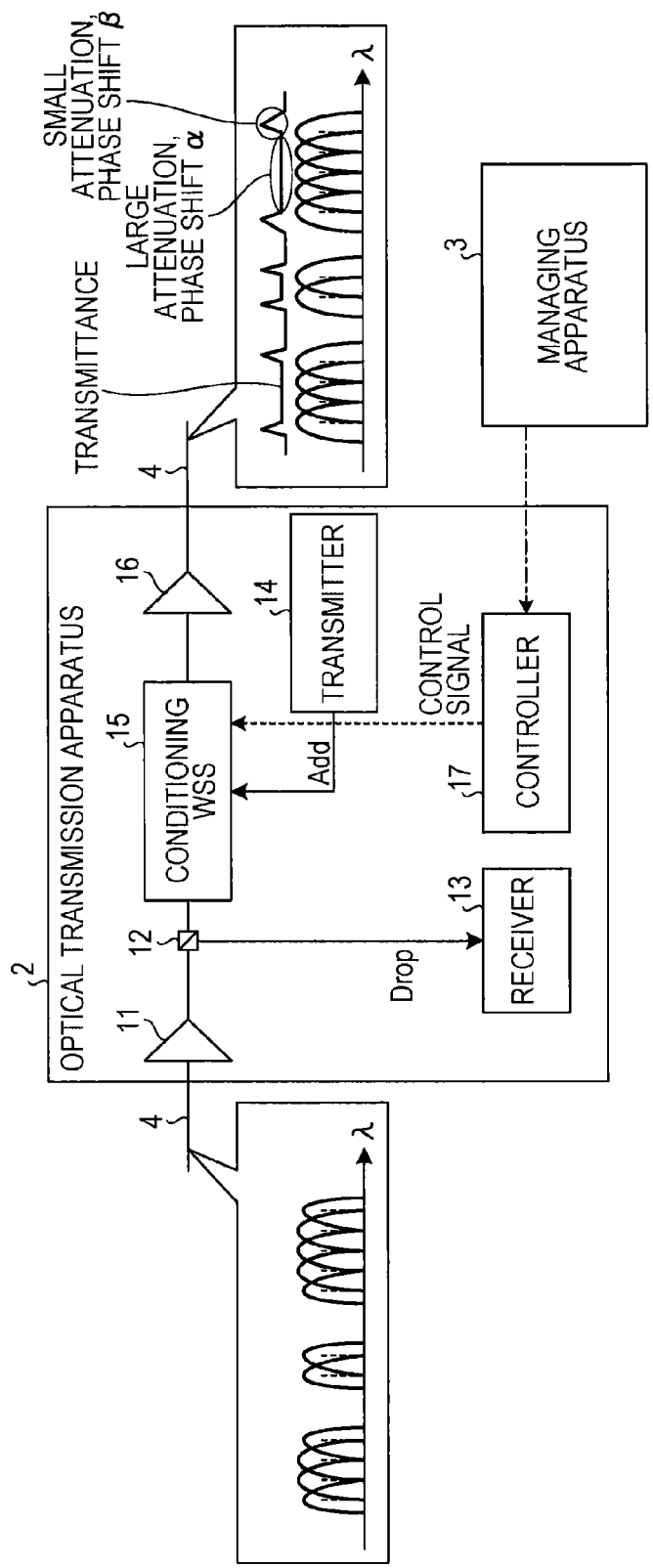
FIG. 3 illustrates an example of an optical transmission apparatus in cut-through mode.

FIG. 3 illustrates an example of an optical transmission apparatus 2 in cut-through mode in the optical transmission system 1. In the optical transmission apparatus 2 illustrated in FIG. 3, the transmittance of the conditioning WSS 15 is adjusted and the subchannel signals in a superchannel signal are adjusted, even in the case of allowing a superchannel signal received over a lightpath 4 to cut through.

Figure 4:
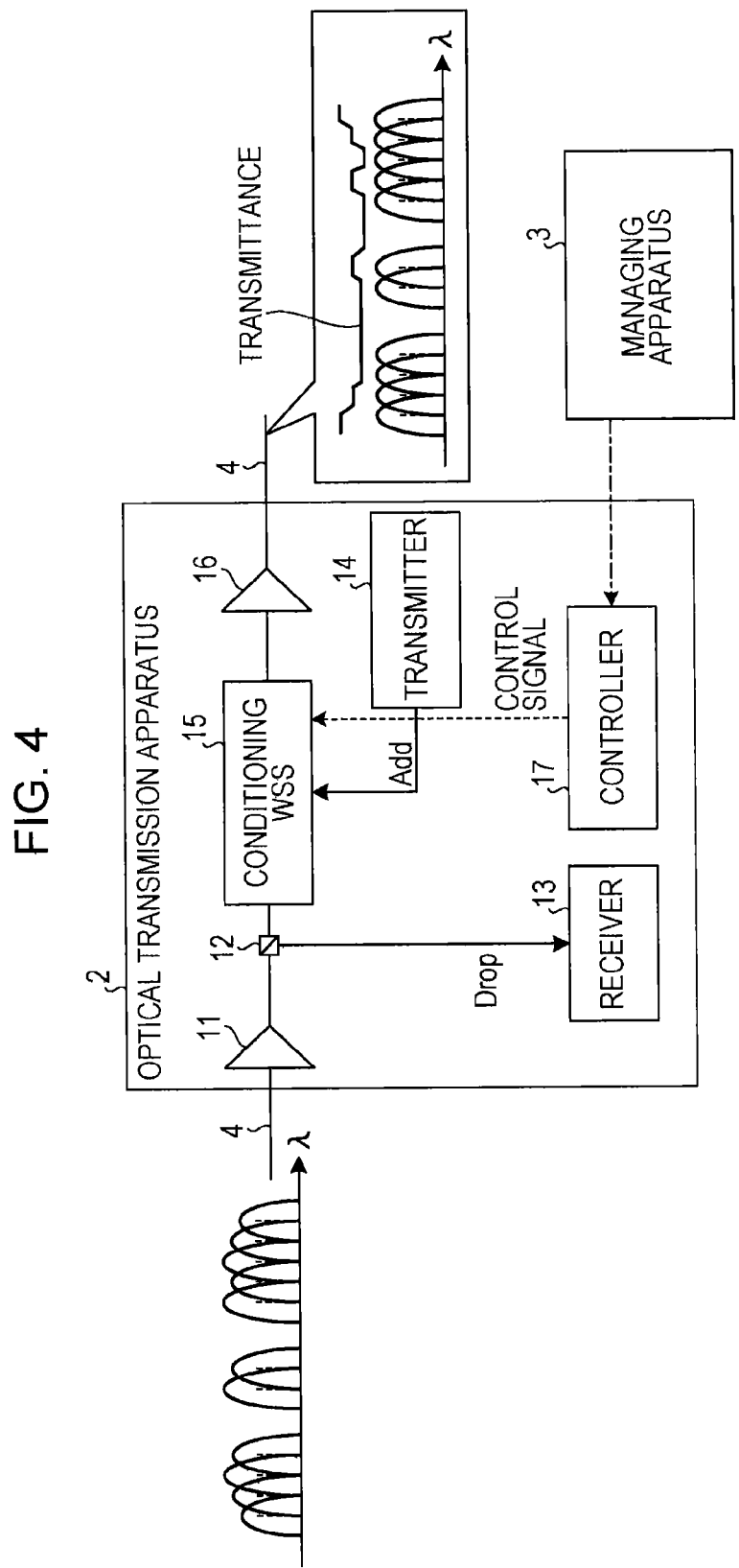
FIG. 4 illustrates an example of an optical transmission apparatus when signal quality variation is produced.

FIG. 4 illustrates an example of an optical transmission apparatus 2 in the optical transmission system 1, in the case where signal quality variation is produced. In the optical transmission apparatus 2 illustrated in FIG. 4, the transmittance of the conditioning WSS 15 is adjusted and the subchannel signals in a superchannel signal are adjusted in the case of receiving a superchannel signal in which signal quality variation has occurred on a lightpath 4.

Figure 5:
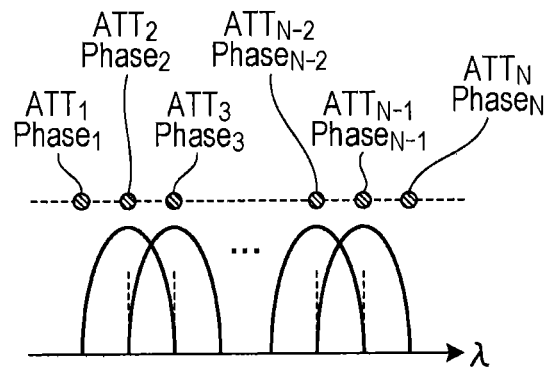
FIG. 5 illustrates an example of a subchannel signal conditioning profile in an optical transmission apparatus.

FIG. 5 illustrates an example of a subchannel signal conditioning profile in the optical transmission apparatus 2. The computing unit 3B of the managing apparatus 3 computes a conditioning level by which to adjust the transmittance (i.e., the attenuation (ATT) and the phase rotation (Phase)) for each center frequency of the subchannels in a superchannel signal. As illustrated in FIG. 5, the computing unit 3B computes a conditioning level that sets all attenuation values from $ATT_1$ to $ATT_N$ equal to a value of a dB, and sets all phase rotation values from $Phase_1$ to $Phase_N$ equal to a value of 0 degrees. As a result, the transmittance of the conditioning WSS 15 is set on the basis of the conditioning level such that all attenuation values and all phase rotation values become equal or nearly equal.

Figure 6:
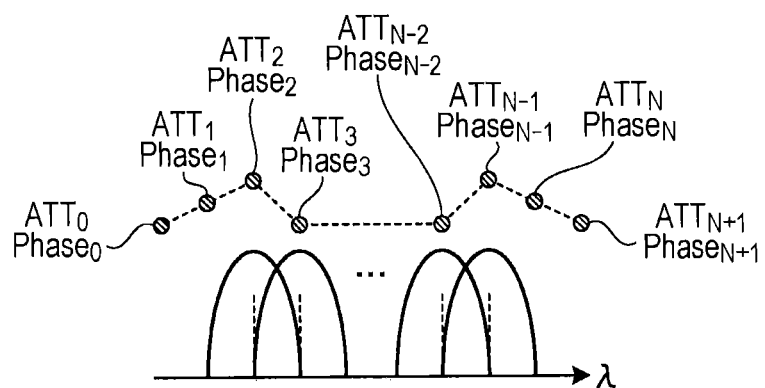
FIG. 6 illustrates an example of a subchannel signal conditioning profile in an optical transmission apparatus in cut-through mode.

FIG. 6 illustrates an example of a subchannel signal conditioning profile in the optical transmission apparatus 2 in cut-through mode. As illustrated in FIG. 6, the computing unit 3B computes a conditioning level that adjusts the subchannel signals in the edge band portion on either end of the superchannel signal, such that $ATT_1 = ATT_N = a_1$, $Phase_1 = Phase_N = \theta_1$, $ATT_2 = ATT_{N-1} = a_2$, and $Phase_2 = Phase_{N-1} = \theta_2$.

Furthermore, as illustrated in FIG. 6, the computing unit 3B computes a conditioning level that adjusts the subchannel signals in the center band portion of the superchannel signal, such that all attenuation values from $ATT_3$ to $ATT_{N-2}$ equal $a_3$, and all phase rotation values from $Phase_3$ to $Phase_{N-2}$ equal $\theta_3$. As a result, the transmittance of the conditioning WSS 15 is set on the basis of the conditioning level such that the attenuation is decreased for subchannel signals in the edge band portion and increased for subchannel signals in the center band portion of the superchannel signal.

Figure 7:
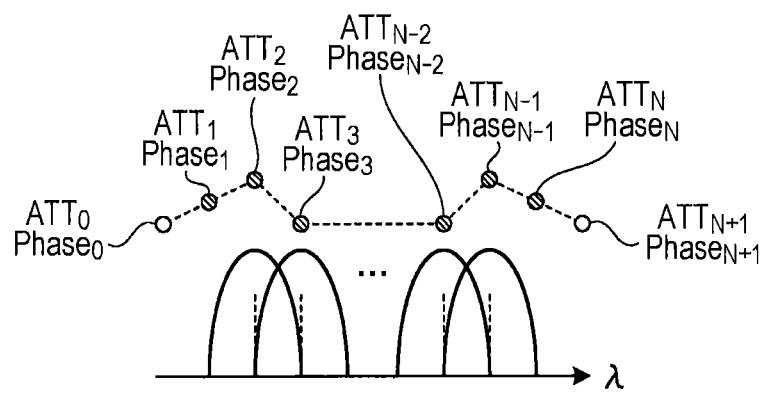
FIG. 7 illustrates an example of a subchannel signal conditioning profile in an optical transmission apparatus in add-drop mode.

FIG. 7 illustrates an example of a subchannel signal conditioning profile in the optical transmission apparatus 2 in add-drop mode. As illustrated in FIG. 7, the computing unit 3B computes a conditioning level that adjusts the subchannel signals in the edge band portion on either end of the superchannel signal, such that $ATT_1 = ATT_N = b_1$, $Phase_1 = Phase_N = \phi_1$, $ATT_2 = ATT_{N-1} = b_2$, and $Phase_2 = Phase_{N-1} = \phi_2$.

Furthermore, as illustrated in FIG. 7, the computing unit 3B of the managing apparatus 3 computes a conditioning level that adjusts the subchannel signals in the center band portion of the superchannel signal, such that all attenuation values from $ATT_3$ to $ATT_{N-2}$ equal $b_3$, and all phase rotation values from $Phase_3$ to $Phase_{N-2}$ equal $\phi_3$. As a result, the transmittance of the conditioning WSS 15 is set on the basis of the conditioning level such that the attenuation is decreased for subchannel signals in the edge band portion and increased for subchannel signals in the center band portion of the superchannel signal.

Once the computing unit 3B has computed a conditioning level for the optical transmission apparatus 2 to be adjusted, the notifying unit 3C in the managing apparatus 3 notifies the optical transmission apparatus 2 to be adjusted of the computed conditioning level via LAN. Upon receiving a conditioning level from the managing apparatus 3 via LAN, the controller 17 in the optical transmission apparatus adjusts the transmittance of the conditioning WSS 15 on the basis of the conditioning level. The conditioning WSS 15 adjusts the gain and phase rotation of each subchannel signal in a superchannel signal, and outputs the adjusted (conditioned) superchannel signal.

As illustrated in FIG. 2, the transmittance of the conditioning WSS 15 is set so as to decrease the attenuation produced in add-drop mode for the subchannel signals in the edge band portion on either end of the superchannel signal, and also to shift the phase rotation towards a normal phase orientation $\beta$. Furthermore, the transmittance of the conditioning WSS 15 is set so as to increase the attenuation for the subchannel signals in the center band portion of the superchannel signal, and also to shift the phase rotation towards a normal phase orientation $\alpha$. As a result, spectral narrowing in the edge band portion is mitigated in the adjusted (conditioned) superchannel signal output by the conditioning WSS 15.

Figure 8:
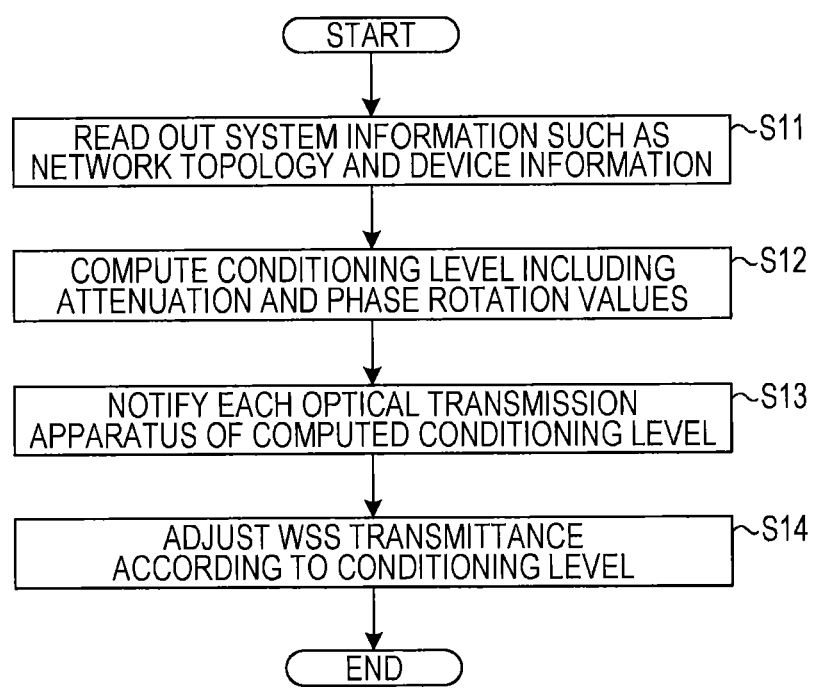
FIG. 8 is a flowchart illustrating exemplary processing operations related to a first conditioning level configuration process in an optical transmission system according to Embodiment 1.

Next, operation of an optical transmission system 1 according to Embodiment 1 will be described. FIG. 8 is a flowchart illustrating exemplary processing operations related to a first conditioning level configuration process in an optical transmission system 1 according to Embodiment 1. The first conditioning level configuration process illustrated in FIG. 8 is a process in which the managing apparatus 3 configures a conditioning level for an optical transmission apparatus 2 to be adjusted in the optical transmission system 1.

In FIG. 8, the computing unit 3B of the managing apparatus 3 reads out system information such as the network topology of the optical transmission system 1 and device information regarding the optical transmission apparatus 2 from the managing unit 3A (step S11). On the basis of the system information thus read out, the computing unit 3B computes an attenuation and phase rotation conditioning level by which to configure the transmittance of the conditioning WSS 15 in the optical transmission apparatus 2 to be adjusted (step S12). Once a conditioning level has been computed, the notifying unit 3C of the managing apparatus 3 notifies the optical transmission apparatus 2 to be adjusted of the computed conditioning level via LAN, for example (step S13).

The controller 17 of the target optical transmission apparatus 2 adjusts the transmittance of the conditioning WSS 15 on the basis of the conditioning level from the managing apparatus 3 (step S14), and then the processing operations illustrated in FIG. 8 end. As a result, the conditioning WSS 15 adjusts the gain and phase rotation of each subchannel signal in a superchannel signal, and outputs the adjusted (conditioned) superchannel signal.

In the first conditioning level configuration process, the managing apparatus 3 computes an attenuation and phase rotation conditioning level by which to configure the transmittance of the conditioning WSS 15 in an optical transmission apparatus 2 to be adjusted, and notifies the target optical transmission apparatus 2 of the computed conditioning level. As a result, the conditioning WSS 15 outputs a superchannel signal that has been adjusted (conditioned) such that the output differential among the subchannel signals in the superchannel signal is less than or equal to a reference threshold.

Since an optical transmission apparatus 2 according to Embodiment 1 adjusts the transmittance of its conditioning WSS 15 on the basis of a conditioning level, the output differential among the subchannel signals become less than or equal to a reference threshold in an adjusted (conditioned) superchannel signal output by the conditioning WSS 15. As a result, deterioration in the quality of a superchannel signal transmitted over a lightpath 4 is mitigated.

Additionally, once an optical transmission apparatus 2 to be adjusted has been identified, the managing apparatus 3 may compute, on the basis of system information, the number of hops corresponding to the superchannel signal transmission path for the target optical transmission apparatus 2, and compute a conditioning level corresponding to the settings and the number of hops. The managing apparatus 3 then notifies the target optical transmission apparatus 2 of the conditioning level. As a result, the optical transmission apparatus 2 to be adjusted may acquire a conditioning level from the managing apparatus 3.

The optical transmission apparatus 2 then configures the transmittance of its conditioning WSS 15 on the basis of the conditioning level, such that the attenuation is decreased for subchannel signals in the edge band portion and increased for subchannel signals in the center band portion of the superchannel signal. As a result, it is possible to minimize spectral narrowing in the edge band portion of a superchannel signal caused by repeated add-drop operations along a lightpath 4, thereby improving optical transmission quality.

Also, the optical transmission apparatus 2 configures the transmittance of its conditioning WSS 15 on the basis of the conditioning level so as to adjust the phase rotation of the edge band portion and the center band portion of the superchannel signal. As a result, it is possible to minimize spectral narrowing in the edge band portion of a superchannel signal caused by repeated add-drop operations along a lightpath 4, thereby improving optical transmission quality.

Embodiment 1 focuses on the case where all subchannel signals in an OFDM superchannel signal are transmitted from and received by the same respective optical transmission apparatus 2. As a result, when comparing waveform characteristics among subchannel signals, it is sufficient to compare waveform characteristics using the subchannel signals in the same superchannel signal, even if there is no information regarding the waveforms at the time of their transmission.

Furthermore, although a conditioning WSS 15 is used in the above Embodiment 1, it may also be configured such that, for example, a conditioning unit with conditioning functions and a WSS are provided separately, with the conditioning unit being disposed at least one of the input and the output of the WSS.

Although the computing unit 3B according to the above Embodiment 1 computes a conditioning level for each center frequency of the subchannel signals in a superchannel signal, the frequency point is not limited to being the center frequency, and may be any frequency point by which a subchannel signal can be adjusted. A plurality of points may also be used.

As illustrated in FIGS. 6 and 7, the computing unit 3B according to the above Embodiment 1 computes a conditioning level such that the subchannel signals in the edge band portion at either end are equalized such that $ATT_1 = ATT_N = a_1$ and $ATT_2 = ATT_{N-1} = a_2$. However, the conditioning levels for the subchannel signals in the edge band portion at either end are not limited to being the same values.

Also, as expressed in equation 1, the computing unit 3B of the managing apparatus 3 computes an attenuation conditioning level on the basis of the number of hops through optical transmission apparatus 2, their set modes, and the attenuation equivalent to one hop. However, the computing unit 3B may be configured to also take into account the deviation and wavelength loss of the optical amplifiers in the optical transmission apparatus 2, as expressed in equation 3. As a result, the attenuation may be set so as to compensate for the gain and optical wavelength-dependent loss in the optical amplifiers and optical components in the optical transmission apparatus 2, to a degree that enables normal communication to be conducted.

$$ATT_{M,h} = ATT_{ref} + J\Delta j_h + K\Delta k_h + L\Delta l_h - \Delta G_{M,h} - \Delta Loss_{M,h} \quad (3)$$

$\Delta G_{M,h}$: deviation of optical amplifier from reference gain at wavelength corresponding to hth level of attenuation/phase rotation settings in optical transmission apparatus M $\Delta Loss_{M,h}$: wavelength loss corresponding to hth level of attenuation/phase rotation settings in optical transmission apparatus M Although in the above Embodiment 1 it is configured such that attenuation and phase rotation values are adjusted as a conditioning level for adjusting the transmittance of a conditioning WSS 15, it may also be configured such that only the attenuation is adjusted.

Furthermore, although the above Embodiment 1 is described as being applied to OFDM superchannel signals, Embodiment 1 may also be applied to wavelength-division multiplexed light such as Nyquist-WDM superchannel signals.

In the above Embodiment 1, the transmittance of a conditioning WSS 15 is adjusted on the basis of a conditioning level from a managing apparatus 3. However, functions for autonomously correcting the conditioning level in an optical transmission apparatus 2 may also be provided within the optical transmission apparatus 2 itself. Such a configuration will be hereinafter described as Embodiment 2.

Embodiment 2

Figure 9:
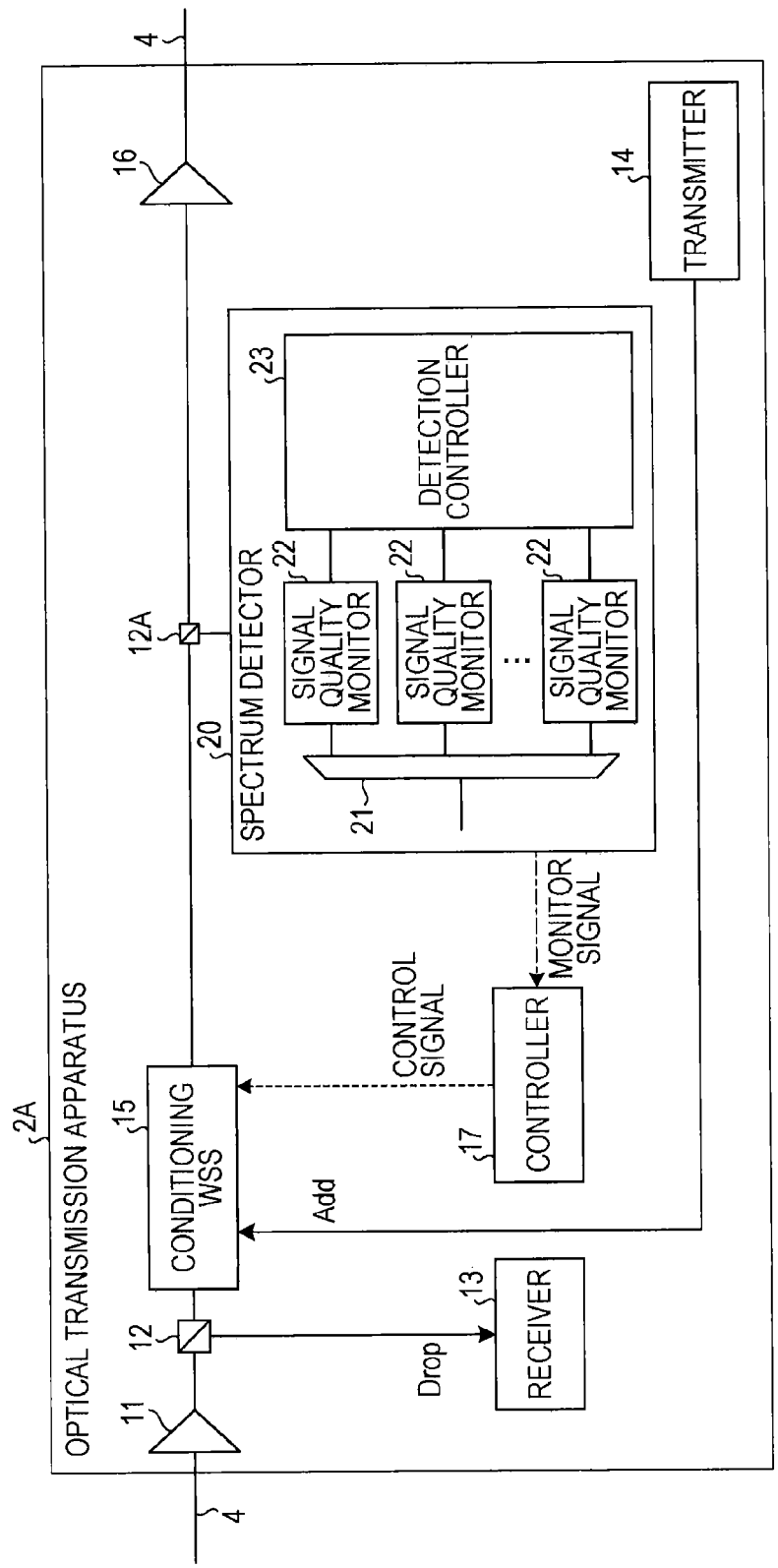
FIG. 9 illustrates an example of an optical transmission apparatus in an optical transmission system according to Embodiment 2.

FIG. 9 illustrates an example of an optical transmission apparatus in an optical transmission system according to Embodiment 2. Herein, like reference signs are given to portions of the configuration which are similar to those of an optical transmission system 1 according to Embodiment 1, and duplicate description of the configuration and operation of such portions will be reduced or omitted. The optical transmission apparatus 2A illustrated in FIG. 9 includes a spectrum detector 20 with built-in digital coherent receiver functions. The spectrum detector 20 detects spectral information regarding superchannel signals that are optically split by an optical splitter 12A disposed between the conditioning WSS 15 and the second optical amplifier 16. Herein, spectral information refers to information regarding each subchannel signal in a superchannel signal, such as the subchannel signal output, chromatic dispersion (phase rotation), and the shape of the baseband spectrum, for example.

The spectrum detector 20 includes a WDM demultiplexing filter 21, signal quality monitors 22, and a detection controller 23. The WDM demultiplexing filter 21 separates an optically split superchannel signal into the optical wavelengths of respective subchannel signals. A combination of tunable filters and signal quality monitors may also be used instead of the WDM demultiplexing filter 21. The signal quality monitors 22 each monitor the signal quality of one of the separated subchannel signals. The detection controller 23 acquires information such as the subchannel signal output, chromatic dispersion, and spectral shape on the basis of the monitoring results from the signal quality monitors 22. The spectrum detector 20 notifies the controller 17 with a monitor signal that indicates the detected spectral information monitoring results.

On the basis of the monitor signal indicating the output of each subchannel signal, the controller 17 computes an average output $P_{ave}$ of the N target subchannel signals in the superchannel signal, as expressed in equation 4. In addition, upon computing the average output $P_{ave}$ of the target subchannel signals, the controller 17 computes the attenuation that would make the computed average output $P_{ave}$ match the output of each subchannel signal $P_i$, and takes the result as a correction value $\Delta ATT_i$, as expressed in equation 5. Then, on the basis of the computed correction value $\Delta ATT_i$, the controller 17 corrects the attenuation $ATT_i$ of the corresponding subchannel acquired from the managing apparatus 3, as expressed in equation 6.

$$P_{ave} = \frac{1}{N}\sum_k P_k \quad (4)$$

$P_{ave}$: average output of subchannel signals
$P_k$: output of a subchannel signal
N: total number of subchannel signals $$\Delta ATT_i = P_i - P_{ave} \quad (5)$$

$ATT_i$: attenuation value for conditioning WSS $$ATT_i' = ATT_i + \Delta ATT_i \quad (6)$$

$ATT_i'$: updated attenuation for conditioning WSS

The controller 17 may also compute a transfer function for a subchannel signal #1, for example, on the basis of the monitor signal indicating the chromatic dispersion (phase rotation) of each subchannel signal, as expressed in equation 7. The subchannel signal #1 may a subchannel signal in the edge band portion, for example. Additionally, the controller 17 may compute a transfer function for a subchannel signal #2, for example, on the basis of the monitor signal, as expressed in equation 8. The controller 17 may then compute the phase rotation at the edge portion with respect to the chromatic dispersion estimated for the subchannel signal #2, and take the result as a correction value $Phase_n$, as expressed in equation 9.

$$H_1(\omega) = \exp\{-j(\omega^2 \beta_2 L/2 + \phi(\omega))\} \quad (7)$$

$H_1(\omega)$: transfer function for subchannel signal #1
$\beta_2$: chromatic dispersion
$\phi(\omega)$: phase rotation at edge portion $$H_2(\omega) = \exp(-j\omega^2 \beta_2 L/2) \quad (8)$$

$H_2(\omega)$: transfer function for subchannel signal #2

$$Phase_n = -\phi(\omega_{phase_n}) \quad (9)$$
$$-H_1(\omega_{phase_n})\exp\{j(\omega_{phase_n}^2 \beta_2 L/2)\}$$

$\omega_{phase_n}$: angular frequency for $Phase_n$
$Phase_n$: phase rotation

Although the chromatic dispersion of a subchannel signal #2 is herein used as a reference chromatic dispersion, the chromatic dispersion of any subchannel signal other than those in the edge band portion from among the target subchannel signals in a superchannel signal may be used as the reference chromatic dispersion. A preset chromatic dispersion may also be acquired from the managing apparatus 3 and used as the reference chromatic dispersion.

Next, operation of an optical transmission system 1 according to Embodiment 2 will be described. FIG. 10 is a flowchart illustrating exemplary processing operations related to a second conditioning level configuration process in an optical transmission system 1 according to Embodiment 2. The second conditioning level configuration process illustrated in FIG. 10 corrects a conditioning level acquired from a managing apparatus 3 on the basis of a monitor signal output by a spectrum detector 20 in an optical transmission apparatus 2A.

In FIG. 10, the managing apparatus 3 executes the processing operations from steps S11 to S13. Then, in step S14 the optical transmission apparatus 2A adjusts the transmittance of its conditioning WSS 15 on the basis of a conditioning level acquired from the managing apparatus 3. The spectrum detector 20 of the optical transmission apparatus 2A outputs a monitor signal regarding the respective subchannel signals in a superchannel signal (step S21). On the basis of the output differential and phase differential indicated by the monitor signal, the controller 17 determines whether or not the output differential and the phase differential are less than or equal to a reference threshold (step S22).

In the case where the output differential and the phase differential are less than or equal to the reference threshold (step S22, Yes), the controller 17 ends the processing operations illustrated in FIG. 10. In the case where the output differential and the phase differential are not less than or equal to the reference threshold (step S22, No), the controller 17 computes attenuation and phase rotation correction values corresponding to the output differential and phase differential (step S23). Additionally, the controller 17 corrects the conditioning level according to the computed correction values, and adjusts the transmittance of the conditioning WSS 15 on the basis of the corrected conditioning level (step S24). After adjusting the transmittance of the conditioning WSS 15, the controller 17 proceeds to step S21 in order to detect a monitor signal.

In the second conditioning level configuration process, the managing apparatus 3 computes an attenuation and phase rotation conditioning level by which to configure the transmittance of the conditioning WSS 15 in an optical transmission apparatus 2A to be adjusted, and notifies the target optical transmission apparatus 2A of the computed conditioning level. As a result, the conditioning WSS 15 outputs a superchannel signal that has been adjusted (conditioned) such that the output differential among the subchannel signals in the superchannel signal is less than or equal to a reference threshold.

Furthermore, in the second conditioning level configuration process, spectral information on the transmitted output from the conditioning WSS 15 is detected as a monitor signal, and correction values corresponding to the output differential and the phase differential are computed on the basis of the monitor signal in the case where the output differential and the phase differential are not less than or equal to a reference threshold. Also, once correction values have been computed, the second conditioning level configuration process corrects the conditioning level by the computed correction values, and adjusts the transmittance of the conditioning WSS 15 on the basis of the corrected conditioning level. As a result, the optical transmission apparatus 2A may autonomously correct a conditioning level acquired from the managing apparatus 3.

An optical transmission apparatus 2A according to Embodiment 2 detects spectral information on the transmitted output from the conditioning WSS 15 as a monitor signal, and computes a correction value corresponding to the output differential and the phase differential on the basis of the monitor signal in the case where the output differential and the phase differential are not less than or equal to a reference threshold. Also, once correction values have been computed, the optical transmission apparatus 2A corrects the conditioning level by the computed correction values, and adjusts the transmittance of the conditioning WSS 15 on the basis of the corrected conditioning level. As a result, the optical transmission apparatus 2A is able to autonomously correct a conditioning level acquired from the managing apparatus 3, thereby enabling high-precision adjustment.

Herein, a controller 17 according to the above Embodiment 2 computes a correction value on the basis of the average output $P_{ave}$ of the target subchannel signals in a superchannel signal. However, the controller 17 may also set a reference value for subchannel signal output in advance, and compute a correction value on the basis of the preset reference value, for example. Additionally, the controller 17 may also focus on target sub-carrier signals in a superchannel signal whose source and destination optical transmission apparatus 2 are the same, take the output of subchannel signals in the center band portion of the superchannel signal as a reference value, and compute a correction value on the basis of the reference value.

Figure 11A:
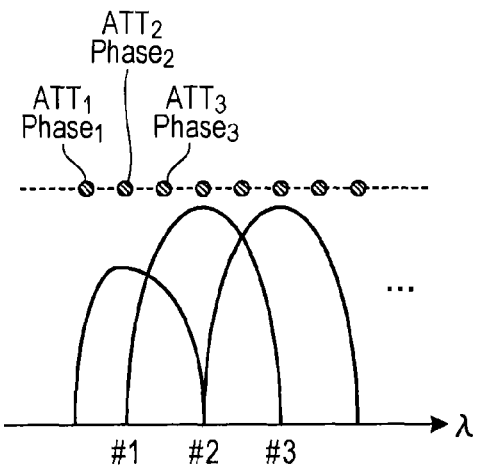
FIGS. 11A to 11C illustrate an exemplary process of computing the output differential between subchannel signals in an optical transmission apparatus according to Embodiment 2.
Figure 11B:
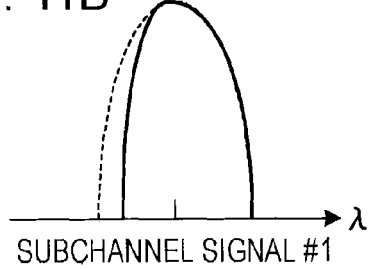
Figure 11C:
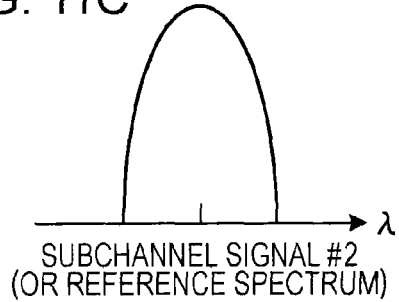

FIGS. 11A to 11C illustrate an exemplary process of computing the output differential between subchannel signals in an optical transmission apparatus 2A according to Embodiment 2. As illustrated in FIGS. 11A to 11C, the controller 17 acquires a monitor signal in the form of the spectral shapes of respective subchannel signals in a superchannel signal, and compares an edge-band subchannel signal #1 to a non-edge-band subchannel signal #2, for example. Then, on the basis of the comparison results between the spectral shape of the subchannel signal #1 and the spectral shape of the subchannel signal #2, the controller 17 may compute a correction value according to their difference (indicated by the broken line in FIG. 11B). Herein, it is assumed that the controller 17 acquires information from the managing apparatus 3 in advance which indicates whether the narrowed spectrum is of short wavelength or long wavelength.

Figure 12A:
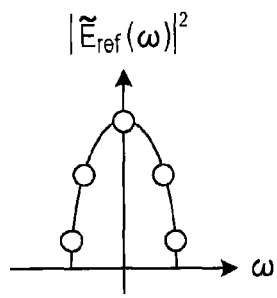
FIGS. 12A and 12B illustrate an exemplary process of computing the output differential between subchannel signals in an optical transmission apparatus according to Embodiment 2.
Figure 12B:
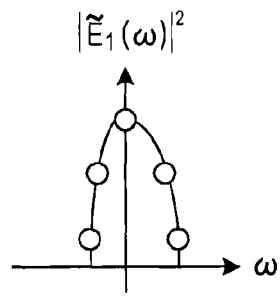

FIGS. 12A and 12B illustrate an exemplary process of computing the output differential between subchannel signals in an optical transmission apparatus 2A according to Embodiment 2. As illustrated in FIGS. 12A and 12B, the controller 17 respectively computes the spectra of subchannel signals #1 to #n by applying the discrete Fourier transform to the electric fields of the subchannel signals #1 to #n, on the basis of a monitor signal that indicates the electric fields of the subchannel signals #1 to #n. Additionally, from among the subchannel signals #1 to #n, the controller 17 compares the spectrum of an edge-band subchannel signal #1 illustrated in FIG. 12B to the spectrum of a reference subchannel signal illustrated in FIG. 12A. Then, on the basis of the comparison results between the spectrum of an edge-band subchannel signal and the spectrum of a reference subchannel signal, the controller 17 may compute a correction value according to their difference, as expressed in equation 10.

$$\Delta ATT_i = |\tilde{E}_1(i\Delta\omega)|^2 - |\tilde{E}_{ref}(i\Delta\omega)|^2 \tag{10}$$

i: index of subchannel signal
$\Delta\omega$: frequency resolution
$E_n(t)$: electric field of subchannel signal #n
$\tilde{E}_n(\omega)$: spectrum of subchannel signal #n The controller 17 also compares the spectrum of a center-band subchannel signal in a superchannel signal to the spectrum of an edge-band subchannel signal. Then, on the basis of the comparison results between the spectrum of an edge-band subchannel signal and the spectrum of a center-band subchannel signal, the controller 17 may compute an attenuation correction value according to their difference, as expressed in equations 11 and 12. In this case, since a target subchannel signal can be compared against a center-band channel in an OFDM superchannel signal, high-precision spectral shaping becomes possible.

$$\Delta ATT_i = |\tilde{E}_1(i\Delta\omega)|^2 - |\tilde{E}_j(i\Delta\omega)|^2 \quad (11)$$

$\tilde{E}_j(\omega)$: spectrum of subchannel at or near center $$ATT_i' = ATT_i + \Delta ATT_i \quad (12)$$

In Embodiment 2, a spectrum detector 20 configured to detect spectral information regarding a superchannel signal is provided at the output of a conditioning WSS 15. However, spectrum detectors 20 may be provided at both the input and the output of the conditioning WSS 15. Such a configuration will be hereinafter described as Embodiment 3.

Embodiment 3

Figure 13:
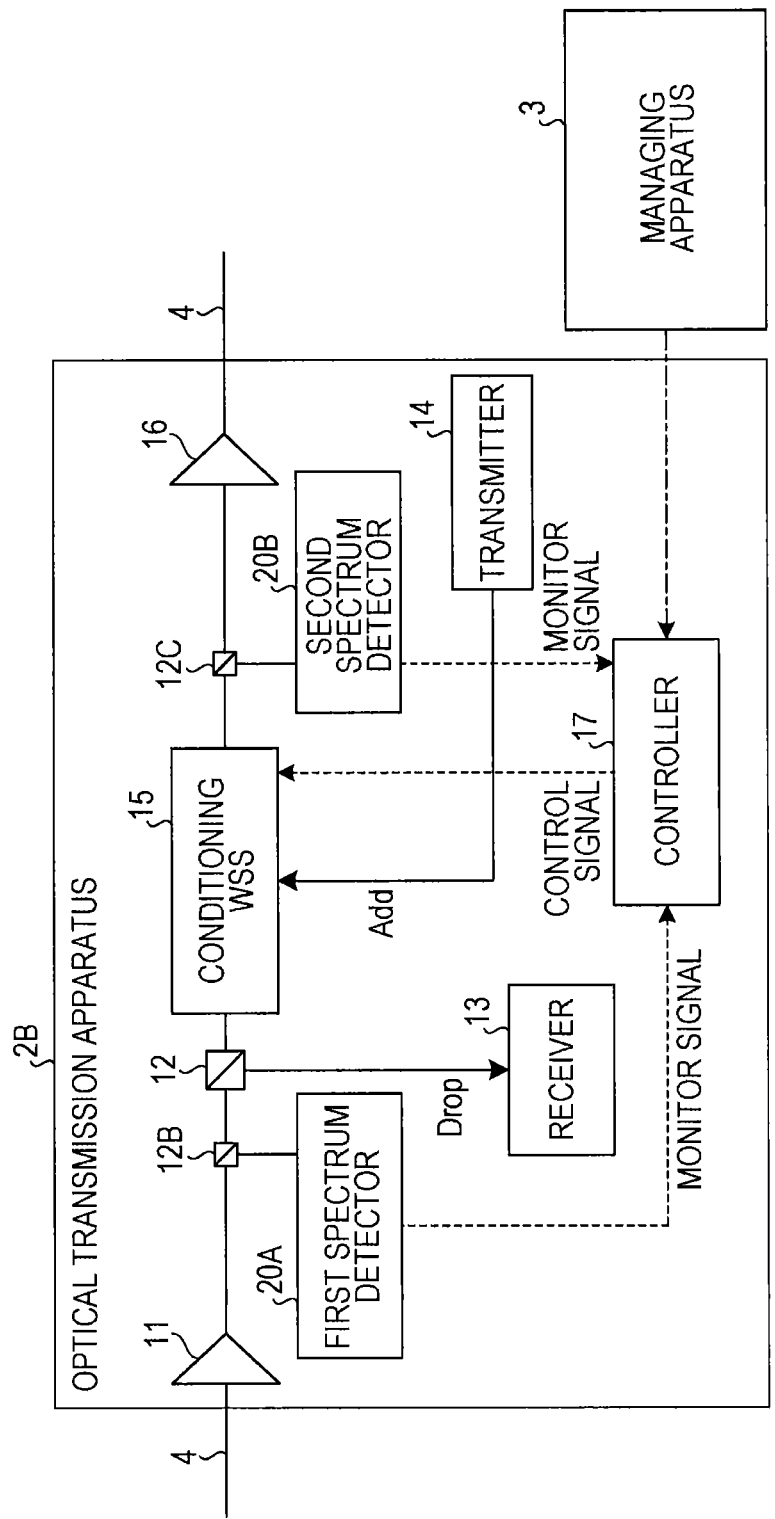
FIG. 13 illustrates an example of an optical transmission apparatus in an optical transmission system according to Embodiment 3.

FIG. 13 illustrates an example of an optical transmission apparatus in an optical transmission system 1 according to Embodiment 3. Herein, like reference signs are given to portions of the configuration which are similar to those of an optical transmission system 1 according to the foregoing embodiments, and duplicate description of the configuration and operation of such portions will be reduced or omitted. The optical transmission apparatus 2B illustrated in FIG. 13 includes a first optical splitter 12B configured to optically split signals between the first optical amplifier 11 and the optical splitter 12, and a second optical splitter 12C configured to optically split signals between the conditioning WSS 15 and the second optical amplifier 16. In addition, the optical transmission apparatus 2B includes a first spectrum detector 20A configured to detect first spectral information regarding a superchannel signal optically split by the first optical splitter 12B. In addition, the optical transmission apparatus 2B includes a second spectrum detector 20B configured to detect second spectral information regarding a superchannel signal optically split by the second optical splitter 12C.

The controller 17 computes correction values for correcting a conditioning level acquired from the managing apparatus 3, on the basis of spectral information detected by the first spectrum detector 20A. The controller 17 also computes correction values for correcting a conditioning level acquired from the managing apparatus 3 on the basis of spectral information detected by the second spectrum detector 20B. The controller 17 then corrects the conditioning level according to the computed correction values, and adjusts the transmittance of the conditioning WSS 15 on the basis of the corrected conditioning level.

Figure 14:
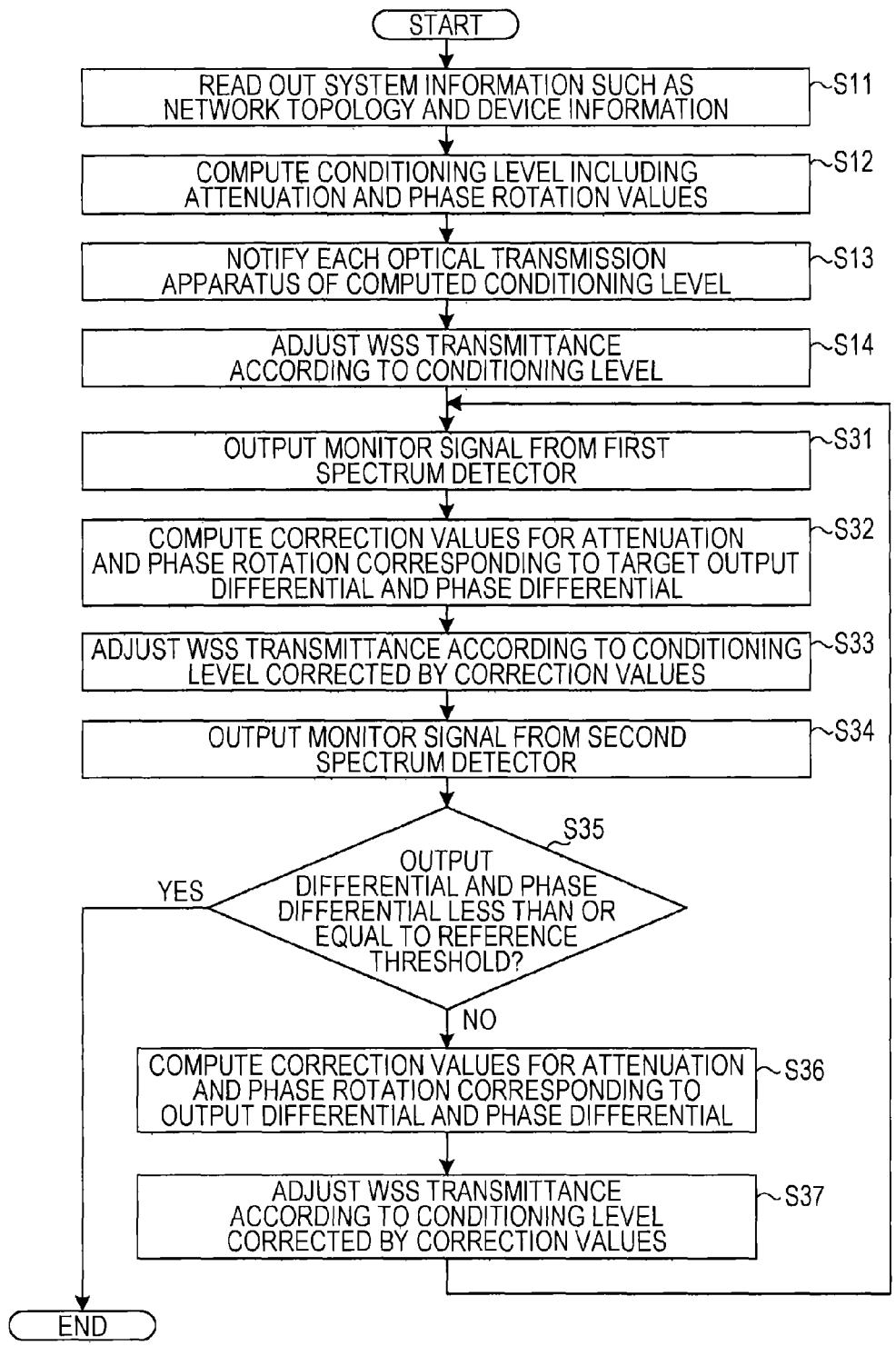
FIG. 14 is a flowchart illustrating exemplary processing operations related to a third conditioning level configuration process in an optical transmission system according to Embodiment 3.

Next, operation of an optical transmission system 1 according to Embodiment 3 will be described. FIG. 14 is a flowchart illustrating exemplary processing operations related to a third conditioning level configuration process in an optical transmission system 1 according to Embodiment 3. The third conditioning level configuration process illustrated in FIG. 14 corrects a conditioning level on the basis of monitor signals output at the input and output of a conditioning WSS 15 in an optical transmission apparatus 2B.

In FIG. 14, the managing apparatus 3 executes the processing operations from steps S11 to S13. Then, in step S14 the optical transmission apparatus 2B adjusts the transmittance of its conditioning WSS 15 on the basis of a conditioning level acquired from the managing apparatus 3. The first spectrum detector 20A of the optical transmission apparatus 2B outputs a monitor signal regarding the respective subchannel signals in a superchannel signal that has been split by the first optical splitter 12B at the input of the conditioning WSS 15 (step S31). On the basis of the output differential and phase differential indicated by the monitor signal, the controller 17 computes attenuation and phase rotation correction values corresponding to a target output differential and phase differential (step S32).

Additionally, the controller 17 corrects the conditioning level according to the computed correction values, and adjusts the transmittance of the conditioning WSS 15 on the basis of the corrected conditioning level (step S33). Meanwhile, the second spectrum detector 20B outputs a monitor signal regarding the respective subchannel signals in a superchannel signal that has been split by the second optical splitter 12C at the output of the conditioning WSS 15 (step S34).

On the basis of the output differential and phase differential indicated by the monitor signal, the controller 17 determines whether or not the output differential and the phase differential are less than or equal to a reference threshold (step S35). In the case where the output differential and the phase differential are less than or equal to the reference threshold (step S35, Yes), the controller 17 ends the processing operations illustrated in FIG. 14. In the case where the output differential and the phase differential are not less than or equal to the reference threshold (step S35, No), the controller 17 computes attenuation and phase rotation correction values corresponding to the output differential and phase differential (step S36). Additionally, the controller 17 corrects the conditioning level according to the computed correction values, and adjusts the transmittance of the conditioning WSS 15 on the basis of the corrected conditioning level (step S37). After adjusting the transmittance of the conditioning WSS 15, the controller 17 proceeds to step S31 in order to detect a monitor signal.

In the third conditioning level configuration process, the managing apparatus 3 computes an attenuation and phase rotation conditioning level by which to configure the transmittance of the conditioning WSS 15 in an optical transmission apparatus 2B to be adjusted, and notifies the target optical transmission apparatus 2B of the computed conditioning level. As a result, the conditioning WSS 15 outputs a superchannel signal that has been adjusted (conditioned) such that the output differential among the subchannel signals in the superchannel signal is less than or equal to a reference threshold.

In the third conditioning level configuration process, a first spectrum detector 20A is disposed at the input of a conditioning WSS 15, correction values are computed on the basis of a monitor signal output from the first spectrum detector 20A, and a conditioning level is corrected according to the correction values. As a result, an optical transmission apparatus 2B may autonomously correct a conditioning level from a managing apparatus 3 on the basis of spectral information regarding a superchannel signal before it is adjusted by a conditioning WSS 15.

In addition, in the third conditioning level configuration process, a second spectrum detector 20B is disposed at the output of a conditioning WSS 15, correction values are computed on the basis of a monitor signal output from the second spectrum detector 20B, and a conditioning level is corrected according to the correction values. As a result, an optical transmission apparatus 2B may autonomously correct a conditioning level from a managing apparatus 3 on the basis of spectral information regarding a superchannel signal after it is adjusted by a conditioning WSS 15.

Figure 15:
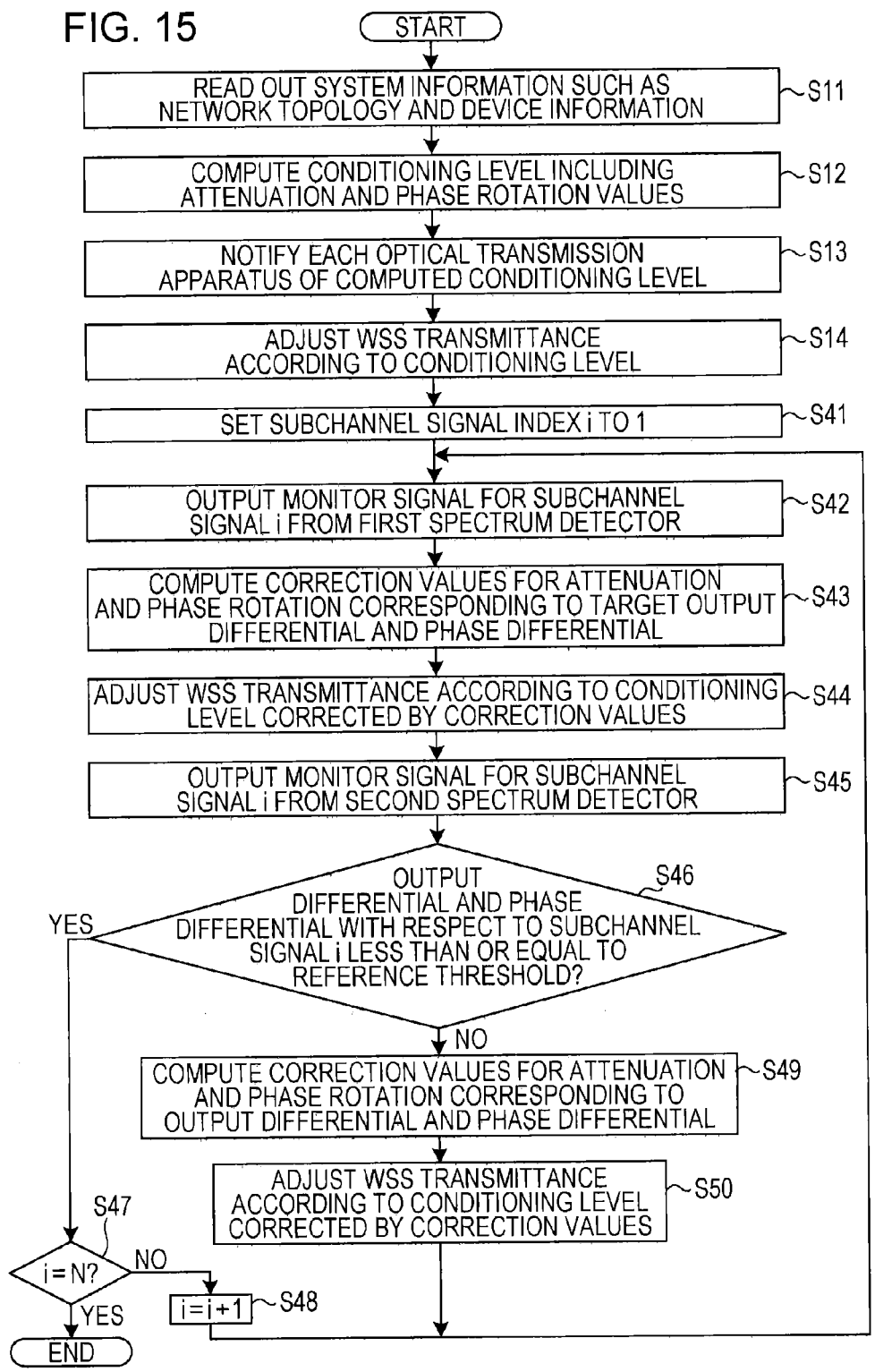
FIG. 15 is a flowchart illustrating exemplary processing operations a fourth conditioning level configuration process in an optical transmission system according to Embodiment 3.

In the third conditioning level configuration process illustrated in FIG. 14 herein, the determination of whether or not the output differential and the phase differential are less than or equal to a reference threshold is made against individual superchannel signals. However, it may also be configured such that the determination of whether or not the output differential and the phase differential are less than or equal to a reference threshold is made against individual subchannel signals. Such a configuration will be hereinafter described as a fourth conditioning level configuration process. FIG. 15 is a flowchart illustrating exemplary processing operations related to a fourth conditioning level configuration process in an optical transmission system 1 according to Embodiment 3. The fourth conditioning level configuration process illustrated in FIG. 15 determines for individual subchannel signals whether or not the output differential and the phase differential are less than or equal to a reference threshold, and corrects the conditioning level for individual subchannel signals.

In step S14 of FIG. 15, the optical transmission apparatus 2B adjusts the transmittance of its conditioning WSS 15 on the basis of a conditioning level acquired from the managing apparatus 3. The controller 17 sets a subchannel signal measurement index i to 1 (step S41). Subsequently, the first spectrum detector 20A outputs a monitor signal for the subchannel signal i to be measured in a superchannel signal that has been split by the first optical splitter 12B at the input of the conditioning WSS 15 (step S42). On the basis of the output differential and phase differential of the target subchannel signal i as indicated by the monitor signal, the controller 17 computes attenuation and phase rotation correction values corresponding to the output differential and the phase differential of the target subchannel signal i (step S43).

Additionally, the controller 17 corrects the conditioning level of the target subchannel signal i according to the computed correction values, and adjusts the transmittance of the conditioning WSS 15 on the basis of the corrected conditioning level (step S44). Meanwhile, the second spectrum detector 20B outputs a monitor signal for the subchannel signal i to be measured in a superchannel signal that has been split by the second optical splitter 12 (step S45).

On the basis of the output differential and phase differential of the target subchannel signal i as indicated by the monitor signal, the controller 17 determines whether or not the output differential and the phase differential of the target subchannel signal i is less than or equal to a reference threshold (step S46). In the case where the output differential and the phase differential are less than or equal to the reference threshold (step S46, Yes), the controller 17 determines whether or not the currently set subchannel signal measurement index i is equal to the number of target subchannels N (step S47). Herein, the controller 17 monitors the subchannel signal measurement index i to determine whether or not all target subchannel signals in a superchannel signal have been set for measurement.

In the case where the currently set subchannel signal measurement index i is equal to N (step S47, Yes), the controller 17 ends the processing operations illustrated in FIG. 15. Meanwhile, in the case where the subchannel signal measurement index i is not equal to N (step S47, No), the controller 17 increments the subchannel signal measurement index i by +1 (step S48), and proceeds to step S42.

In the case where the output differential and the phase differential of the target subchannel signal i are not less than or equal to the reference threshold (step S46, No), the controller 17 computes attenuation and phase rotation correction values corresponding to the output differential and the phase differential of the target subchannel signal i (step S49). Additionally, the controller 17 corrects the conditioning level of the target subchannel signal i according to the computed correction values, and adjusts the transmittance of the conditioning WSS 15 on the basis of the corrected conditioning level (step S50). After adjusting the transmittance of the conditioning WSS 15, the controller 17 proceeds to step S42 in order to detect a monitor signal.

In the fourth conditioning level configuration process, a first spectrum detector 20A is disposed at the input of a conditioning WSS 15, correction values for individual subchannel signals are computed on the basis of a monitor signal output from the first spectrum detector 20A, and a conditioning level is corrected according to the correction values. As a result, an optical transmission apparatus 2B may autonomously correct a conditioning level from a managing apparatus 3 for individual subchannel signals on the basis of spectral information regarding a superchannel signal before it is adjusted by a conditioning WSS 15.

In addition, in the fourth conditioning level configuration process, a second spectrum detector 20B is disposed at the output of a conditioning WSS 15, correction values for individual subchannel signals are computed on the basis of a monitor signal output from the second spectrum detector 20B, and a conditioning level is corrected according to the correction values. As a result, an optical transmission apparatus 2B may autonomously correct a conditioning level from a managing apparatus 3 for individual subchannel signals on the basis of spectral information regarding a superchannel signal after it is adjusted by a conditioning WSS 15.

An optical transmission apparatus 2B according to the above Embodiment 3 computes correction values on the basis of a monitor signal detected at the input of a conditioning WSS 15, and corrects a conditioning level according to the correction values. As a result, an optical transmission apparatus 2B is able to autonomously correct a conditioning level from a managing apparatus 3 on the basis of spectral information regarding a superchannel signal before it is adjusted by a conditioning WSS 15, thereby enabling high-precision adjustment.

In addition, the optical transmission apparatus 2B computes correction values on the basis of a monitor signal detected at the output of the conditioning WSS 15, and corrects a conditioning level according to the correction values. As a result, an optical transmission apparatus 2B is able to autonomously correct a conditioning level from a managing apparatus 3 on the basis of spectral information regarding a superchannel signal after it is adjusted by a conditioning WSS 15, thereby enabling high-precision adjustment.

Furthermore, since the optical transmission apparatus 2B corrects a conditioning level according to correction values based on a monitor signal detected at the input of the conditioning WSS 15, the output differential and the phase differential decrease at the output of the conditioning WSS 15. As a result, correction values based on a monitor signal at the output of the conditioning WSS 15 can be computed faster.

In the above Embodiment 3, spectrum detectors 20 are individually disposed at the input and the output of the conditioning WSS 15. However, it may also be configured such that spectral information regarding a superchannel signal is detected at the input and the output of the conditioning WSS 15 with a single spectrum detector 20. A configuration for this case will be hereinafter described as Embodiment 4.

Embodiment 4

Figure 16:
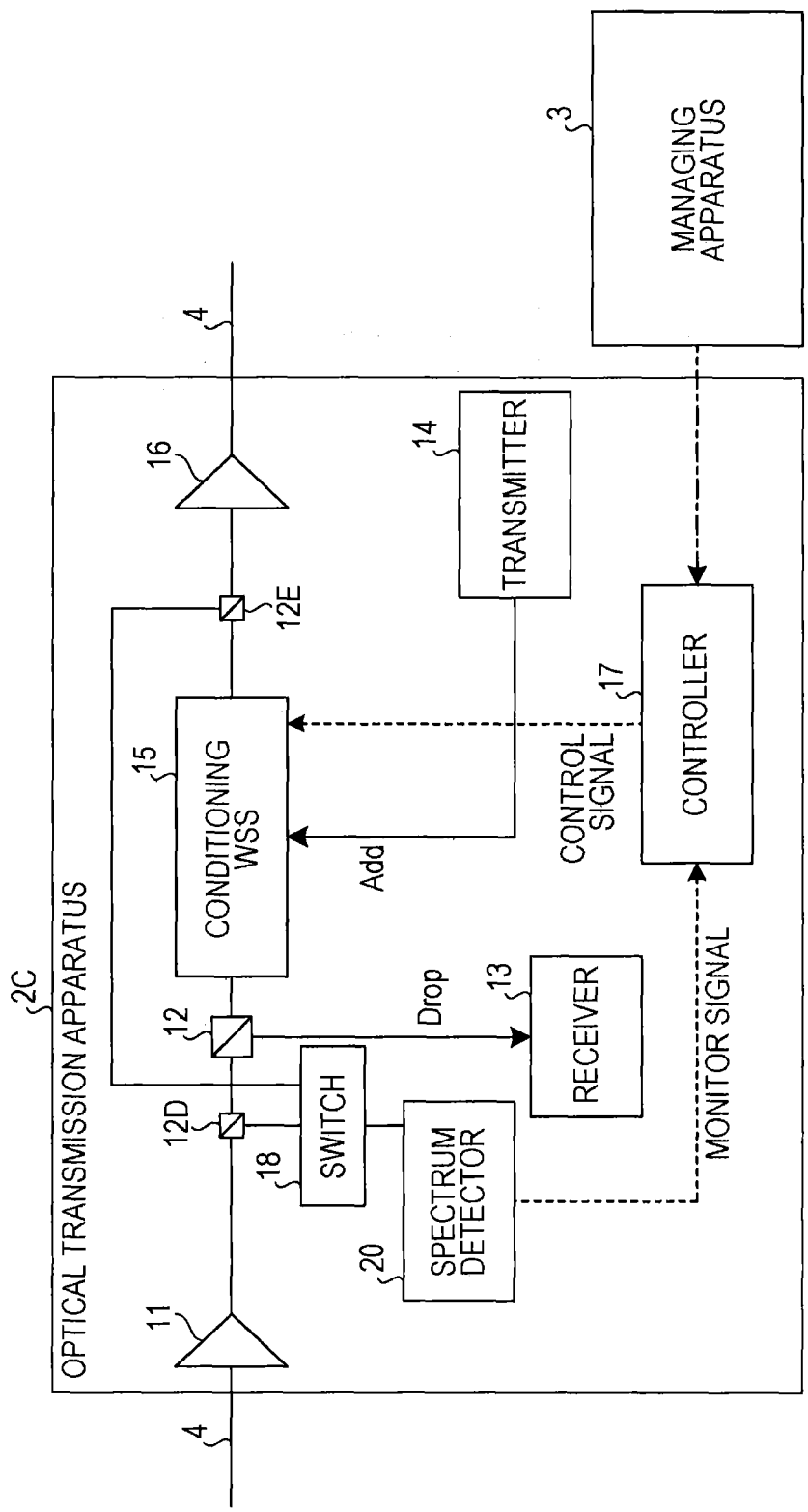
FIG. 16 illustrates an example of an optical transmission apparatus in an optical transmission system according to Embodiment 4.

FIG. 16 illustrates an example of an optical transmission apparatus in an optical transmission system according to Embodiment 4. Herein, like reference signs are given to portions of the configuration which are similar to those of an optical transmission system 1 according to the foregoing embodiments, and duplicate description of the configuration and operation of such portions will be reduced or omitted. The optical transmission apparatus 2C illustrated in FIG. 16 includes a third optical splitter 12D configured to optically split signals between the first optical amplifier 11 and the optical splitter 12, and a fourth optical splitter 12E configured to optically split signals between the conditioning WSS 15 and the second optical amplifier 16. In addition, the optical transmission apparatus 2C includes a switch 18 configured to selectively switch between a superchannel signal optically split by the third optical splitter 12D and a superchannel signal optically split by the fourth optical splitter 12E. The spectrum detector 20 of the optical transmission apparatus 2C detects spectral information regarding a superchannel signal selected by the switch 18.

The controller 17 computes correction values for correcting a conditioning level acquired from the managing apparatus 3, on the basis of spectral information detected by the spectrum detector 20. The controller 17 then corrects the conditioning level according to the computed correction values, and adjusts the transmittance of the conditioning WSS 15 on the basis of the corrected conditioning level.

Figure 17:
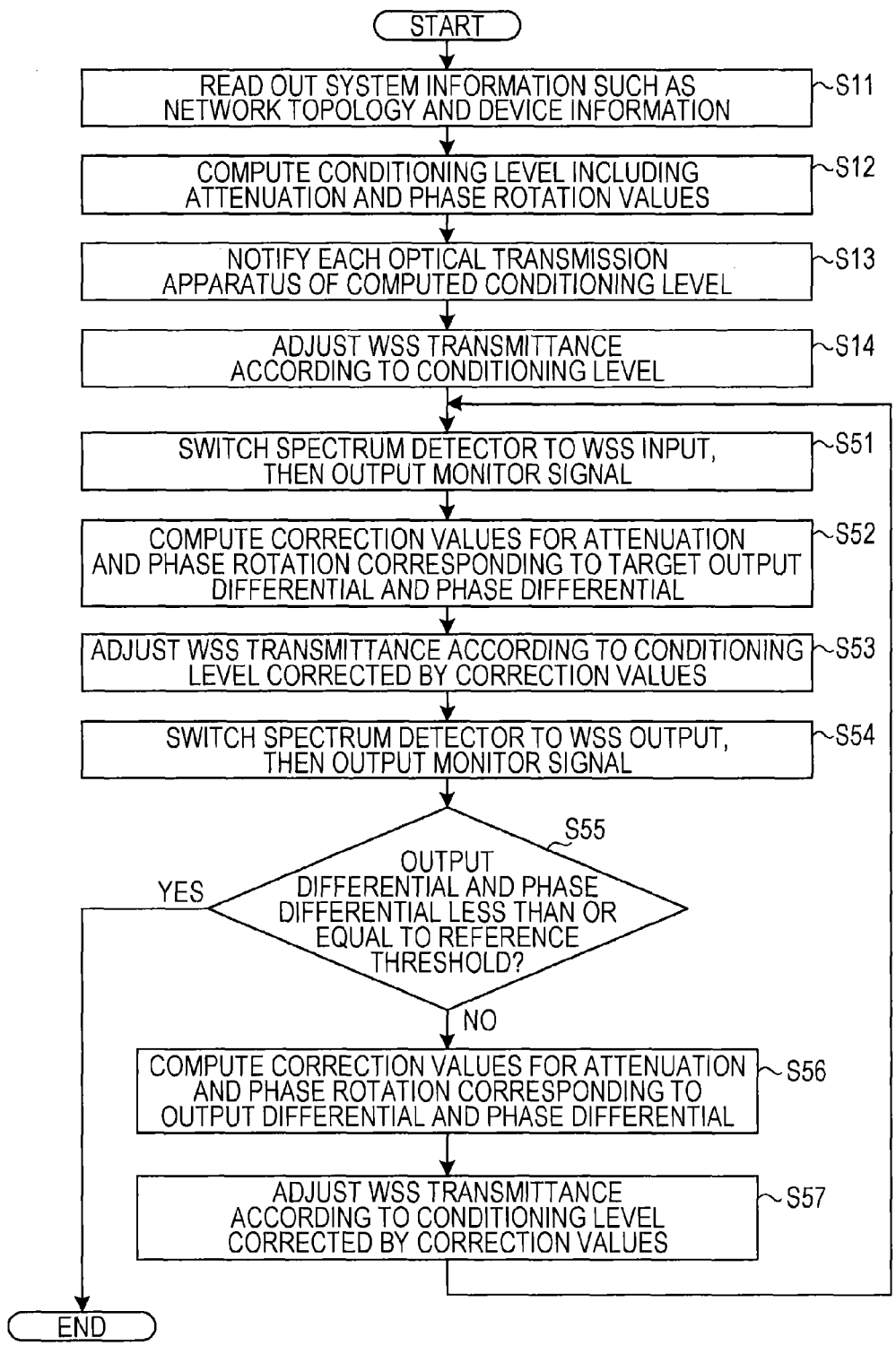
FIG. 17 is a flowchart illustrating exemplary processing operations related to a fifth conditioning level configuration process in an optical transmission system according to Embodiment 4.

Next, operation of an optical transmission system 1 according to Embodiment 4 will be described. FIG. 17 is a flowchart illustrating exemplary processing operations related to a fifth conditioning level configuration process in an optical transmission system 1 according to Embodiment 4. The fifth conditioning level configuration process illustrated in FIG. 17 corrects a conditioning level on the basis of monitor signals output at the input and output of a conditioning WSS 15 in an optical transmission apparatus 2C.

In FIG. 17, the managing apparatus 3 executes the processing operations from steps S11 to S13. Then, in step S14 the optical transmission apparatus 2C adjusts the transmittance of its conditioning WSS 15 on the basis of a conditioning level acquired from the managing apparatus 3. The switch 18 is switched to the third optical splitter 12D, and subsequently the spectrum detector 20 outputs a monitor signal regarding the respective subchannel signals in a superchannel signal that has been split by the third optical splitter 12D (step S51). On the basis of the output differential and phase differential indicated by the monitor signal, the controller 17 computes attenuation and phase rotation correction values corresponding to a target output differential and phase differential (step S52).

Additionally, the controller 17 corrects the conditioning level according to the computed correction values, and adjusts the transmittance of the conditioning WSS 15 on the basis of the corrected conditioning level (step S53). In addition, the switch 18 is switched to the fourth optical splitter 12E, and subsequently the spectrum detector 20 outputs a monitor signal regarding the respective subchannel signals in a superchannel signal that has been split by the fourth optical splitter 12E (step S54).

On the basis of the output differential and phase differential indicated by the monitor signal, the controller 17 determines whether or not the output differential and the phase differential are less than or equal to a reference threshold (step S55). In the case where the output differential and the phase differential are less than or equal to the reference threshold (step S55, Yes), the controller 17 ends the processing operations illustrated in FIG. 17. In the case where the output differential and the phase differential are not less than or equal to the reference threshold (step S55, No), the controller 17 computes attenuation and phase rotation correction values corresponding to the output differential and phase differential (step S56). Additionally, the controller 17 corrects the conditioning level according to the computed correction values, and adjusts the transmittance of the conditioning WSS 15 on the basis of the corrected conditioning level (step S57). After adjusting the transmittance of the conditioning WSS 15, the controller 17 proceeds to step S51 in order to detect a monitor signal.

In the fifth conditioning level configuration process, the managing apparatus 3 computes an attenuation and phase rotation conditioning level by which to configure the transmittance of the conditioning WSS 15 in an optical transmission apparatus 2C to be adjusted, and notifies the target optical transmission apparatus 2C of the computed conditioning level. As a result, the conditioning WSS 15 outputs a superchannel signal that has been adjusted (conditioned) such that the output differential among the subchannel signals in the superchannel signal is less than or equal to a reference threshold.

Additionally, in the fifth conditioning level configuration process, a switch 18 is switched to the input of a conditioning WSS 15, correction values are computed on the basis of a monitor signal output from a spectrum detector 20, and a conditioning level is corrected according to the correction values. As a result, an optical transmission apparatus 2C may autonomously correct a conditioning level from a managing apparatus 3 on the basis of spectral information regarding a superchannel signal before it is adjusted by a conditioning WSS 15.

Also, in the fifth conditioning level configuration process, the switch 18 is switched to the output of the conditioning WSS 15, correction values are computed on the basis of a monitor signal output from the spectrum detector 20, and a conditioning level is corrected according to the correction values. As a result, an optical transmission apparatus 2C may autonomously correct a conditioning level from a managing apparatus 3 on the basis of spectral information regarding a superchannel signal after it is adjusted by a conditioning WSS 15.

Figure 18:
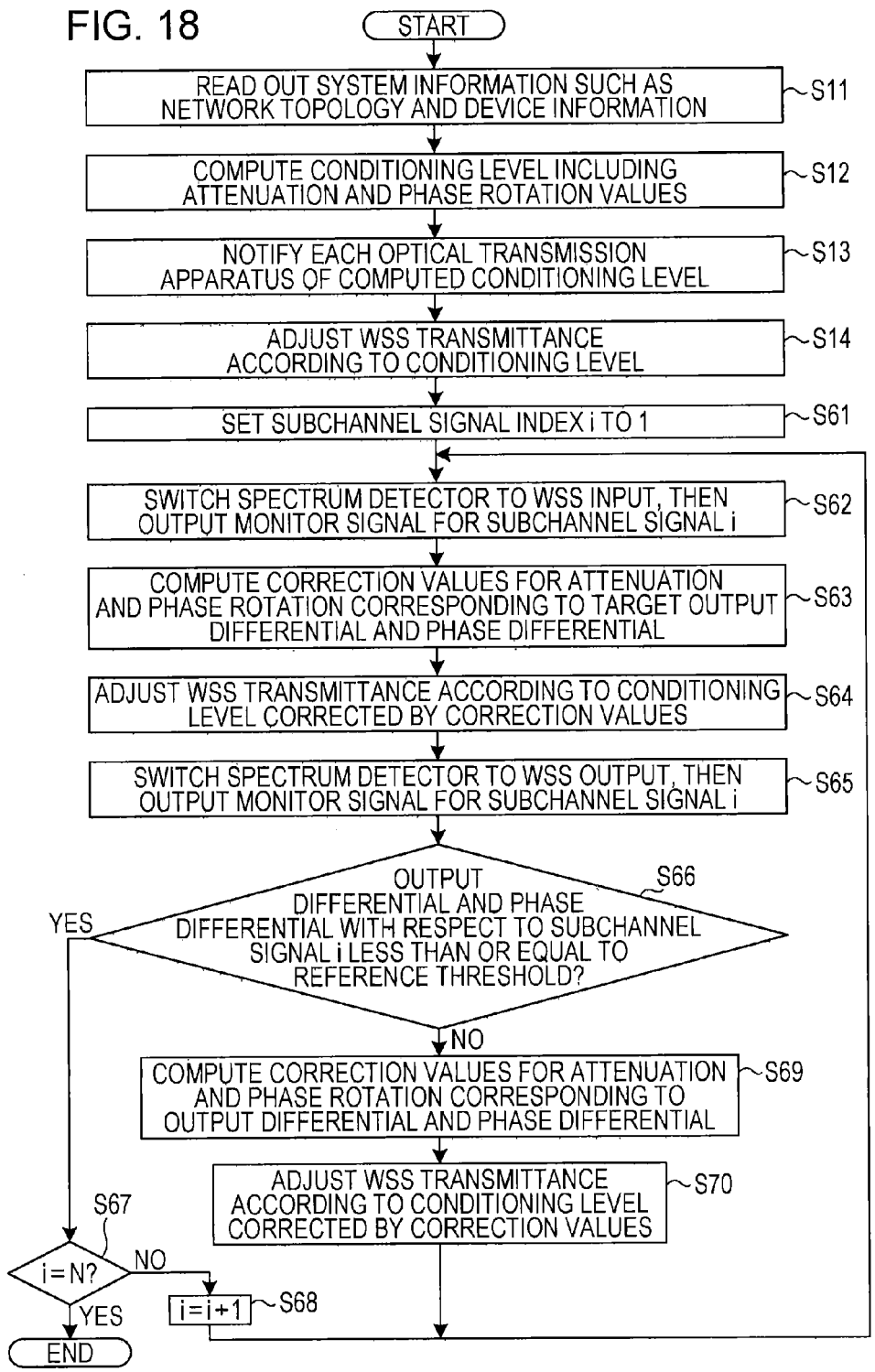
FIG. 18 is a flowchart illustrating exemplary processing operations related to a sixth conditioning level configuration process in an optical transmission system according to Embodiment 4.

In the fifth conditioning level configuration process illustrated in FIG. 17 herein, the determination of whether or not the output differential and the phase differential are less than or equal to a reference threshold is made against individual superchannel signals. However, it may also be configured such that the determination of whether or not the output differential and the phase differential are less than or equal to a reference threshold is made against individual subchannel signals. Such a configuration will be hereinafter described as a sixth conditioning level configuration process. FIG. 18 is a flowchart illustrating exemplary processing operations related to a sixth conditioning level configuration process in an optical transmission system 1 according to Embodiment 4. The sixth conditioning level configuration process illustrated in FIG. 18 determines for individual subchannel signals whether or not the output differential and the phase differential are less than or equal to a reference threshold, and corrects the conditioning level for individual subchannel signals.

In step S14 of FIG. 18, the optical transmission apparatus 2C adjusts the transmittance of its conditioning WSS 15 on the basis of a conditioning level acquired from the managing apparatus 3. The controller 17 sets a measurement target subchannel signal index i to 1 (step S61). The switch 18 is switched to the third optical splitter 12D, and subsequently the spectrum detector 20 outputs a monitor signal regarding a target subchannel signal i to be measured in a superchannel signal that has been split by the third optical splitter 12D (step S62). On the basis of the output differential and phase differential of the target subchannel signal i indicated by the monitor signal, the controller 17 computes attenuation and phase rotation correction values corresponding to the output differential and the phase differential of the target subchannel signal i (step S63).

Additionally, the controller 17 corrects the conditioning level of the target subchannel signal i according to the computed correction values, and adjusts the transmittance of the conditioning WSS 15 on the basis of the corrected conditioning level (step S64). In addition, the switch 18 is switched to the fourth optical splitter 12E, and subsequently the spectrum detector 20 outputs a monitor signal regarding a target subchannel signal to be measured in a superchannel signal that has been split by the fourth optical splitter 12E (step S65).

On the basis of the output differential and phase differential of the target subchannel signal i as indicated by the monitor signal, the controller 17 determines whether or not the output differential and the phase differential of the target subchannel signal i is less than or equal to a reference threshold (step S66). In the case where the output differential and the phase differential are less than or equal to the reference threshold (step S66, Yes), the controller 17 determines whether or not the currently set subchannel signal measurement index i is equal to the number of target subchannels N (step S67). Herein, the controller 17 monitors whether or not the setting of target subchannel signals for measurement in a superchannel signal has been completed.

In the case where the currently set subchannel signal measurement index i is equal to N (step S67, Yes), the controller 17 ends the processing operations illustrated in FIG. 18. Meanwhile, in the case where the subchannel signal measurement index i is not equal to N (step S67, No), the controller 17 increments the subchannel signal measurement index i by +1 (step S68), and proceeds to step S62.

In the case where the output differential and the phase differential of the target subchannel signal i are not less than or equal to the reference threshold (step S66, No), the controller 17 computes attenuation and phase rotation correction values corresponding to the output differential and the phase differential of the target subchannel signal i (step S69). Additionally, the controller 17 corrects the conditioning level of the target subchannel signal i according to the computed correction values, and adjusts the transmittance of the conditioning WSS 15 on the basis of the corrected conditioning level (step S70). After adjusting the transmittance of the conditioning WSS 15, the controller 17 proceeds to step S62 in order to detect a monitor signal.

In the sixth conditioning level configuration process, a switch 18 is switched to the input of a conditioning WSS 15, correction values are computed for an individual subchannel signal on the basis of a monitor signal output from a spectrum detector 20, and a conditioning level is corrected according to the correction values. As a result, an optical transmission apparatus 2C may autonomously correct a conditioning level from a managing apparatus 3 for individual subchannel signals on the basis of spectral information regarding a superchannel signal before it is adjusted by a conditioning WSS 15.

Also, in the sixth conditioning level configuration process, the switch 18 is switched to the output of the conditioning WSS 15, correction values are computed for an individual subchannel signal on the basis of a monitor signal output from a spectrum detector 20, and a conditioning level is corrected according to the correction values. As a result, an optical transmission apparatus 2C may autonomously correct a conditioning level from a managing apparatus 3 for individual subchannel signals on the basis of spectral information regarding a superchannel signal after it is adjusted by a conditioning WSS 15.

Since an optical transmission apparatus 2C according to the above Embodiment 4 detects spectral information at the input and the output of its conditioning WSS 15 with a single spectrum detector 20, component costs may be reduced.

Furthermore, the optical transmission apparatus 2C computes correction values on the basis of a monitor signal detected at the input of the conditioning WSS 15, and corrects a conditioning level according to the correction values. As a result, an optical transmission apparatus 2C is able to autonomously correct a conditioning level from a managing apparatus 3 on the basis of spectral information regarding a superchannel signal before it is adjusted by a conditioning WSS 15, thereby enabling high-precision adjustment.

Furthermore, the optical transmission apparatus 2C computes correction values on the basis of a monitor signal detected at the output of the conditioning WSS 15, and corrects a conditioning level according to the correction values. As a result, an optical transmission apparatus 2C is able to autonomously correct a conditioning level from a managing apparatus 3 on the basis of spectral information regarding a superchannel signal after it is adjusted by a conditioning WSS 15, thereby enabling high-precision adjustment.

Additionally, since the optical transmission apparatus 2C corrects a conditioning level according to correction values based on a monitor signal detected at the input of the conditioning WSS 15, the output differential and the phase differential decrease at the output of the conditioning WSS 15. As a result, faster computation of correction values based on a monitor signal regarding the transmitted output of the conditioning WSS 15 becomes possible.

In the above Embodiment 4, a spectrum detector 20 is provided as a separate unit within an optical transmission apparatus 2C. However, it may also be configured such that the spectrum detector 20 is built into the receiver 13. A configuration for this case will be hereinafter described as Embodiment 5.

Embodiment 5

Figure 19:
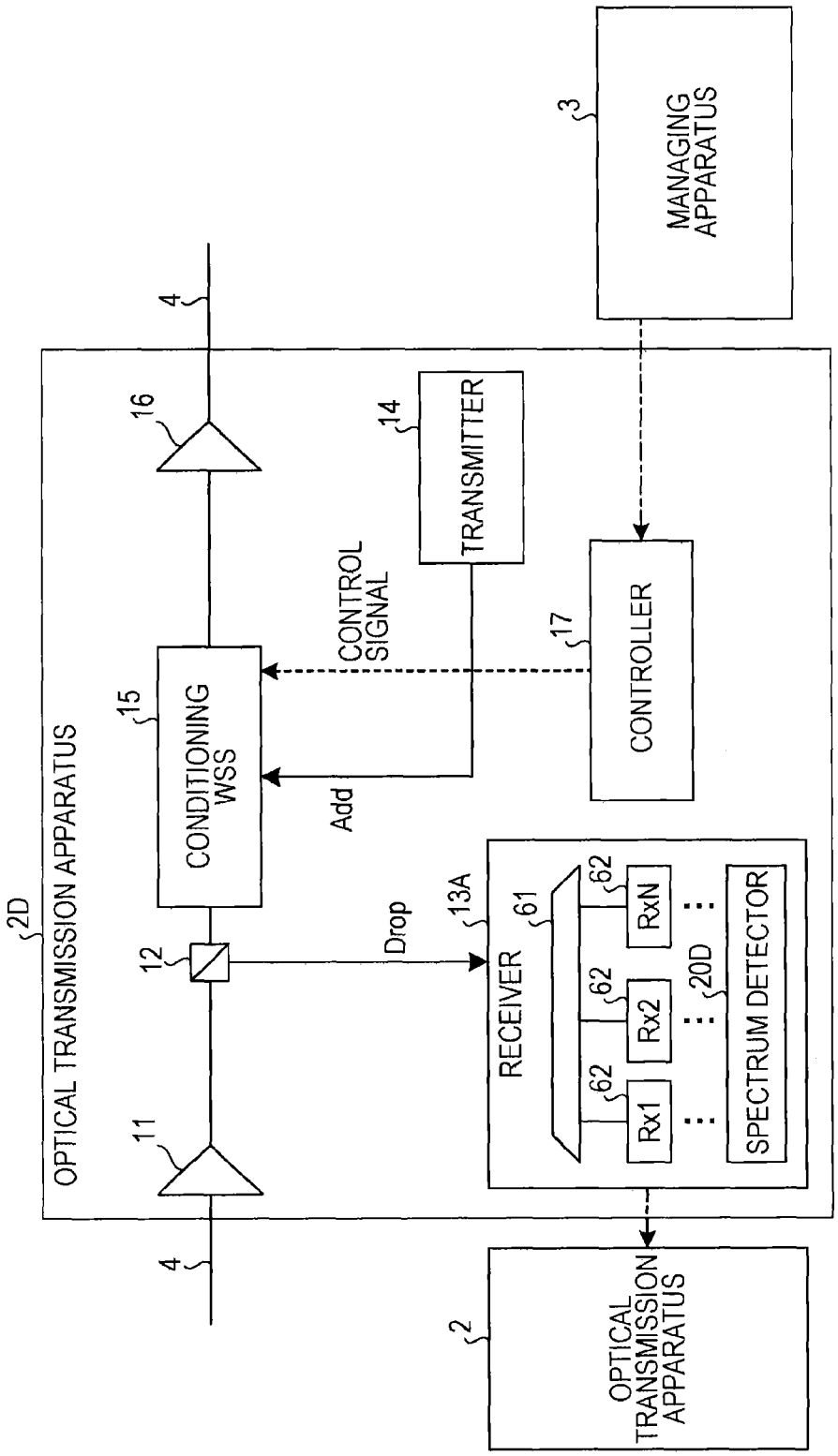
FIG. 19 illustrates an example of an optical transmission apparatus in an optical transmission system according to Embodiment 5.

FIG. 19 illustrates an example of an optical transmission apparatus in an optical transmission system 1 according to Embodiment 5. Herein, like reference signs are given to portions of the configuration which are similar to those of an optical transmission system 1 according to the foregoing embodiments, and duplicate description of the configuration and operation of such portions will be reduced or omitted. The optical transmission apparatus 2D illustrated in FIG. 19 includes a receiver 13A with built-in spectrum detecting functions. The receiver 13A includes a demultiplexer 61, receivers (Rx) 62, and a spectrum detector 20D. The demultiplexer 61 separates subchannel signals in a superchannel signal that has been optically split by the first optical splitter 12. Additionally, the spectrum detector 20D detects spectral information regarding respective subchannel signals separated by the demultiplexer 61. Herein, the spectrum detector 20D has an internal configuration that is nearly the same as that of the spectrum detector 20 discussed earlier.

The optical transmission apparatus 2D also forwards spectral information monitoring results detected by the spectrum detector 20D in the receiver 13A as a monitor signal, which is transmitted to another optical transmission apparatus 2D in the optical transmission system 1 via a lightpath 4 or LAN, for example.

Upon receiving a monitor signal from a downstream optical transmission apparatus 2D, the controller 17 of the optical transmission apparatus 2D computes correction values on the basis of the monitor signal. The controller 17 then corrects a conditioning level according to the correction values, and adjusts the transmittance of the conditioning WSS 15 on the basis of the corrected conditioning level.

Figure 20:
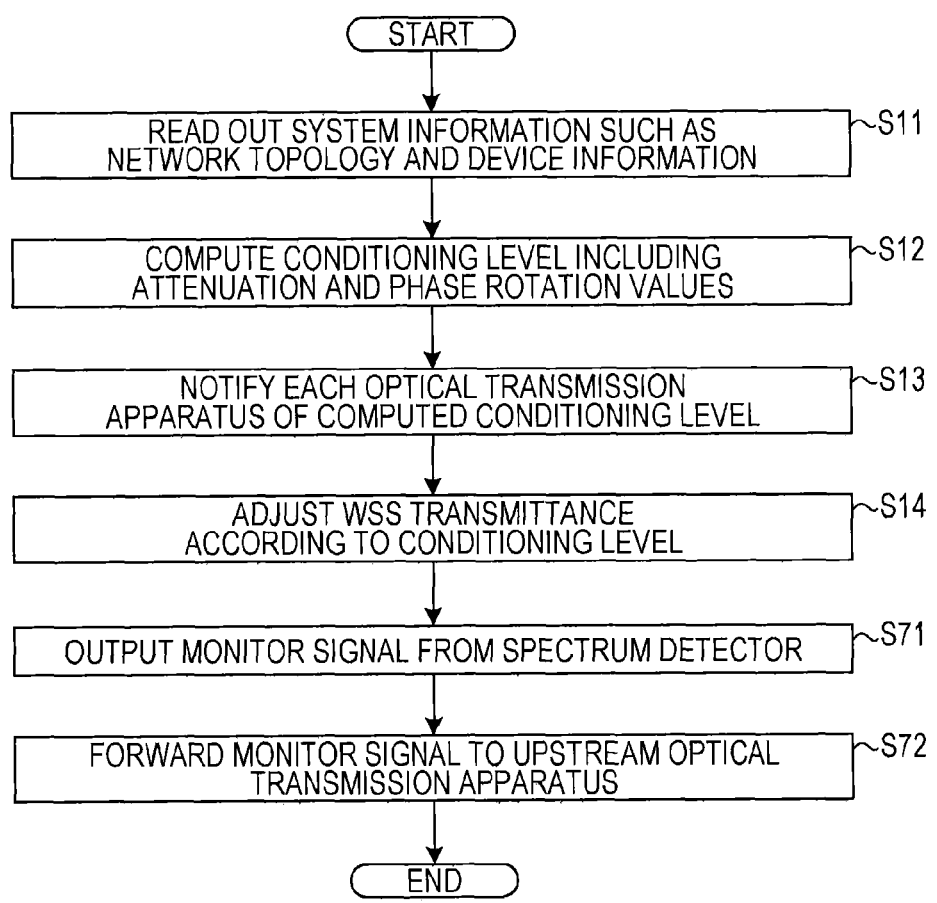
FIG. 20 is a flowchart illustrating exemplary processing operations related to a seventh conditioning level configuration process in an optical transmission system according to Embodiment 5.

Next, operation of an optical transmission system 1 according to Embodiment 5 will be described. FIG. 20 is a flowchart illustrating exemplary processing operations related to a seventh conditioning level configuration process in an optical transmission system 1 according to Embodiment 5. The seventh conditioning level configuration process illustrated in FIG. 20 forwards a monitor signal output by an optical transmission apparatus 2D to an upstream optical transmission apparatus 2.

In FIG. 20, the managing apparatus 3 executes the processing operations from steps S11 to S13. Then, in step S14 the optical transmission apparatus 2D adjusts the transmittance of its conditioning WSS 15 on the basis of a conditioning level acquired from the managing apparatus 3. Additionally, the spectrum detector 20D of the optical transmission apparatus 2D outputs a monitor signal regarding respective subchannel signals in a superchannel signal that has been optically split by the first optical splitter 12 (step S71).

When a monitor signal is output, the controller 17 of the optical transmission apparatus 2D forwards the monitor signal to an upstream optical transmission apparatus 2 (step S72), and ends the processing operations illustrated in FIG. 20.

In the seventh conditioning level configuration process, the managing apparatus 3 computes an attenuation and phase rotation conditioning level by which to configure the transmittance of the conditioning WSS 15 in an optical transmission apparatus 2D to be adjusted, and notifies the target optical transmission apparatus 2D of the computed conditioning level. As a result, the conditioning WSS 15 is able to output a superchannel signal that has been adjusted (conditioned) such that the output differential among the subchannel signals in the superchannel signal is less than or equal to a reference threshold.

Furthermore, in the seventh conditioning level configuration process, spectral information on the transmitted output from the conditioning WSS 15 is detected as a monitor signal, and the monitor signal is forwarded to an upstream optical transmission apparatus 2. As a result, the upstream optical transmission apparatus 2D may compute correction values on the basis of the monitor signal from the downstream optical transmission apparatus 2D, correct its conditioning level according to the computed correction values, and adjust the transmittance of its conditioning WSS 15 on the basis of the conditioning level.

Figure 21A:
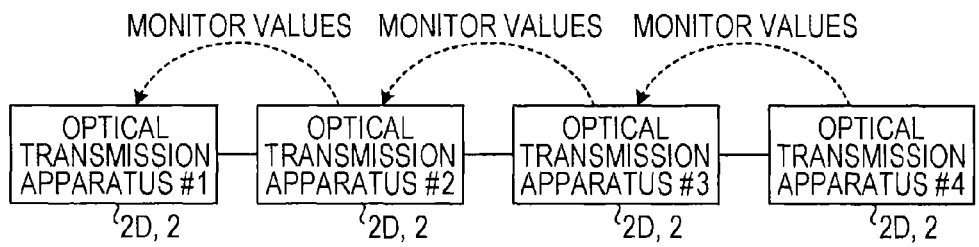
FIGS. 21A to 21C illustrate an example of monitor signal forwarding operation in optical transmission apparatus in an optical transmission system according to Embodiment 5.
Figure 21B:
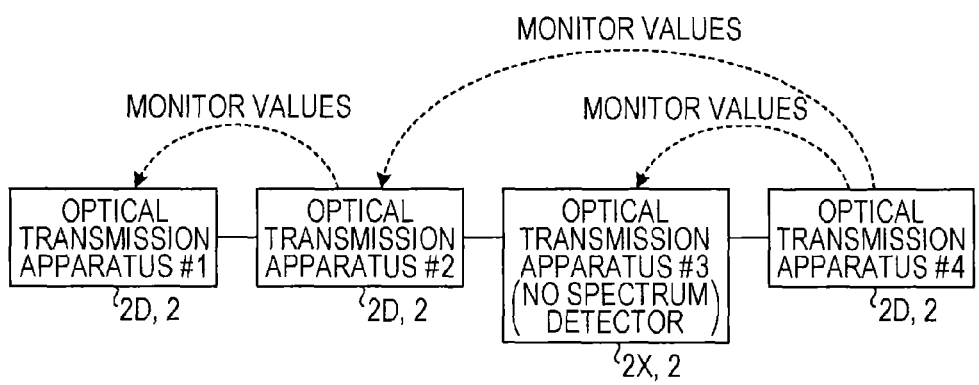
Figure 21C:
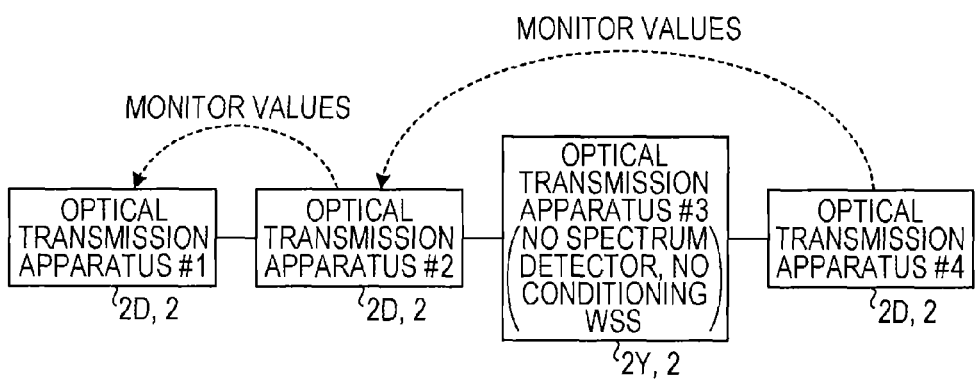

Operation will now be described for the case where an optical transmission apparatus 2D forwards a monitor signal to an upstream optical transmission apparatus 2. FIGS. 21A to 21C illustrate an example of monitor signal forwarding operation in optical transmission apparatus 2D in an optical transmission system 1 according to Embodiment 5. FIG. 21A illustrates a situation in which a superchannel signal is transmitted from an optical transmission apparatus 2 #1, to an optical transmission apparatus 2 #2, to an optical transmission apparatus 2 #3, to an optical transmission apparatus 2 #4, in the case where the optical transmission apparatus 2 #1 to #4 are configured as optical transmission apparatus 2D.

When spectral information is detected and output as a monitor signal via the spectrum detector 20D in the optical transmission apparatus 2D #4, the monitor signal is forwarded to the upstream optical transmission apparatus 2D #3. As a result, upon detecting the monitor signal the optical transmission apparatus 2D #3 computes correction values on the basis of the monitor signal. The optical transmission apparatus 2D #3 then corrects its conditioning level according to the correction values, and adjusts the transmittance of its conditioning WSS 15 on the basis of the corrected conditioning level.

Subsequently, when spectral information is detected and output as a monitor signal via the spectrum detector 20D in the optical transmission apparatus 2D #3, the monitor signal is forwarded to the upstream optical transmission apparatus 2D #2. As a result, upon detecting the monitor signal the optical transmission apparatus 2D #2 computes correction values on the basis of the monitor signal. The optical transmission apparatus 2D #2 then corrects its conditioning level according to the correction values, and adjusts the transmittance of its conditioning WSS 15 on the basis of the corrected conditioning level.

Subsequently, when spectral information is detected and output as a monitor signal via the spectrum detector 20D in the optical transmission apparatus 2D #2, the monitor signal is forwarded to the upstream optical transmission apparatus 2D #1. As a result, upon detecting the monitor signal the optical transmission apparatus 2D #1 computes correction values on the basis of the monitor signal. The optical transmission apparatus 2D #1 then corrects its conditioning level according to the correction values, and adjusts the transmittance of its conditioning WSS 15 on the basis of the corrected conditioning level.

When a monitor signal is output from the optical transmission apparatus 2D #4 in the case where the upstream optical transmission apparatus 2 is the optical transmission apparatus 2D #3 with built-in spectrum detecting and conditioning functions, that monitor signal is transmitted to the upstream optical transmission apparatus 2D #3. Subsequently, the optical transmission apparatus 2D #3 may compute correction values on the basis of the monitor signal, compute a conditioning level according to the computed correction values, and adjust the transmittance of its conditioning WSS 15 on the basis of the computed conditioning level.

Meanwhile, the optical transmission apparatus 2 #3 illustrated in FIG. 21B is configured as an optical transmission apparatus 2X that has a built-in conditioning WSS 15 but does not have a built-in spectrum detector 20D, while the optical transmission apparatus 2 #1, #2, and #4 are all configured as optical transmission apparatus 2D.

When spectral information is detected and output as a monitor signal via the spectrum detector 20D in the optical transmission apparatus 2D #4, the monitor signal is forwarded to the upstream optical transmission apparatus 2X #3. In addition, the optical transmission apparatus 2D #4 recognizes that the upstream optical transmission apparatus 2X #3 has a built-in conditioning WSS 15 but lacks a spectrum detector, and thus also forwards the monitor signal to the next upstream optical transmission apparatus 2D #2.

Upon detecting the monitor signal, the optical transmission apparatus 2X #3 computes correction values on the basis of the monitor signal. The optical transmission apparatus 2X #3 then corrects its conditioning level according to the correction values, and adjusts the transmittance of its conditioning WSS 15 on the basis of the corrected conditioning level.

Similarly, upon detecting the monitor signal the optical transmission apparatus 2D #2 computes correction values on the basis of the monitor signal. The optical transmission apparatus 2D #2 then corrects its conditioning level according to the correction values, and adjusts the transmittance of its conditioning WSS 15 on the basis of the corrected conditioning level. At this point, since the optical transmission apparatus 2X #3 and the optical transmission apparatus 2D #2 are adjusting correction values on the basis of the same monitor signal, their conditioning levels are corrected according to correction values equal to one-half their respectively computed correction values. However, the ratio of the correction values is not limited to one-half.

Subsequently, when spectral information is detected and output as a monitor signal via the spectrum detector 20D in the optical transmission apparatus 2D #2, the monitor signal is forwarded to the upstream optical transmission apparatus 2D #1. As a result, upon detecting the monitor signal the optical transmission apparatus 2D #1 computes correction values on the basis of the monitor signal. The optical transmission apparatus 2D #1 then corrects its conditioning level according to the correction values, and adjusts the transmittance of its conditioning WSS 15 on the basis of the corrected conditioning level.

In the case where the optical transmission apparatus 2 upstream to an optical transmission apparatus 2D #4 is an optical transmission apparatus 2X #3 which has built-in conditioning functions but does not have built-in spectrum detecting functions, and where the optical transmission apparatus 2 upstream to the optical transmission apparatus 2X #3 is an optical transmission apparatus 2D #2, the optical transmission apparatus 2D #4 forwards its monitor signal to both the optical transmission apparatus 2X #3 and the optical transmission apparatus 2D #2. As a result, the optical transmission apparatus 2X #3 and the optical transmission apparatus 2D #2 may each compute correction values on the basis of the monitor signal, compute a conditioning level according to the computed correction values, and adjust the transmittance of their respective conditioning WSS 15 on the basis of the computed conditioning level.

Meanwhile, the optical transmission apparatus 2 #3 illustrated in FIG. 21C is configured as an optical transmission apparatus 2Y with a built-in WSS that does not have spectrum detecting functions or conditioning functions, while the optical transmission apparatus 2 #1, #2, and #4 are all configured as optical transmission apparatus 2D.

Since the WSS built into the optical transmission apparatus 2Y #3 does not have spectrum detecting functions or conditioning functions, when spectral information is detected and output as a monitor signal via the spectrum detector 20D in the optical transmission apparatus 2D #4, the monitor signal is forwarded to the next upstream optical transmission apparatus 2D #2.

Upon detecting the monitor signal, the optical transmission apparatus 2D #2 computes correction values on the basis of the monitor signal. The optical transmission apparatus 2D #2 then corrects its conditioning level according to the correction values, and adjusts the transmittance of its conditioning WSS 15 on the basis of the corrected conditioning level. Subsequently, when spectral information is detected and output as a monitor signal via the spectrum detector 20D in the optical transmission apparatus 2D #2, the monitor signal is forwarded to the upstream optical transmission apparatus 2D #1.

As a result, upon detecting the monitor signal the optical transmission apparatus 2D #1 computes correction values on the basis of the monitor signal. The optical transmission apparatus 2D #1 then corrects its conditioning level according to the correction values, and adjusts the transmittance of its conditioning WSS 15 on the basis of the corrected conditioning level.

In the case where the optical transmission apparatus 2 upstream to an optical transmission apparatus 2D #4 is an optical transmission apparatus 2Y #3 which does not have spectrum detecting functions or conditioning functions, and where the optical transmission apparatus 2 upstream to the optical transmission apparatus 2Y #3 is an optical transmission apparatus 2D #2, the optical transmission apparatus 2D #4 forwards its monitor signal to the optical transmission apparatus 2D #2. As a result, the optical transmission apparatus 2D #2 may compute correction values on the basis of the monitor signal, compute a conditioning level according to the computed correction values, and adjust the transmittance of its conditioning WSS 15 on the basis of the computed conditioning level.

An optical transmission apparatus 2D according to Embodiment 5 includes a spectrum detector 20D built into a receiver 13A, and is configured to forward a monitor signal output from the spectrum detector 20D to an upstream optical transmission apparatus 2. As a result, the upstream optical transmission apparatus 2 is able to compute correction values on the basis of the monitor signal from the downstream optical transmission apparatus 2D and compute a conditioning level on the basis of the computed correction values, thereby enabling high-precision adjustment.

Although an optical transmission apparatus 2D according to Embodiment 5 is configured to forward a monitor signal to an upstream optical transmission apparatus 2 when the monitor signal is output, the monitor signal may also be forwarded to a managing apparatus 3.

Meanwhile, an optical transmission apparatus 2 may also be configured such that conditioning functions for adjusting the gain and phase rotation of subchannel signals in a superchannel signal are provided in a transmitter 30 that transmits the superchannel signal. An embodiment for this case will be hereinafter described as Embodiment 6.

Embodiment 6

FIG. 22 illustrates an example of an optical transmission apparatus in an optical transmission system according to Embodiment 6. Herein, like reference signs are given to portions of the configuration which are similar to those of an optical transmission system 1 according to the foregoing embodiments, and duplicate description of the configuration and operation of such portions will be reduced or omitted. The optical transmission apparatus 2E illustrated in FIG. 22 includes a conditioning transmitter 30. The conditioning transmitter 30 has built-in functions for transmitting a superchannel signal and conditioning functions for adjusting the gain and phase rotation of subchannel signals in a superchannel signal. The controller 17 adjusts the conditioning WSS 15 and the conditioning transmitter 30 on the basis of a conditioning level acquired from a managing apparatus 3.

FIG. 23 illustrates an example of a conditioning transmitter 30 in an optical transmission apparatus 2E according to Embodiment 6. The conditioning transmitter 30 illustrated in FIG. 23 includes light sources 31, optical transmitters 32, conditioning multiplexers 33, and a multiplexer 34. The light sources 31 generate optical signals at different optical wavelengths. The optical transmitters 32 optically modulate optical signals generated by the light sources 31 and transmit subchannel signals. Additionally, the conditioning multiplexers 33 multiplex a plurality of subchannel signals transmitted by the optical transmitters 32 to generate a superchannel signal. On the basis of a conditioning level, the controller 17 adjusts the transmittance of the conditioning multiplexers 33, and adjusts the gain and phase rotation of the subchannel signals to be multiplexed.

In addition, the multiplexer 34 multiplexes the superchannel signals generated by the conditioning multiplexers 33 and optically inserts (adds) the multiplexed superchannel signal into the conditioning WSS 15.

Since the conditioning transmitter 30 in FIG. 23 is provided with conditioning multiplexers 33 with built-in conditioning functions configured to generate superchannel signals by multiplexing subchannel signals, the configurable dynamic range may be increased.

Although the conditioning transmitter 30 illustrated in FIG. 23 includes multiplexers with built-in conditioning functions configured to multiplex a plurality of subchannel signals, conditioning functions may also be built into the multiplexer 34 that multiplexes a plurality of superchannel signals, for example. Conditioning functions may also be built into the optical transmitters 32.

Figure 24:
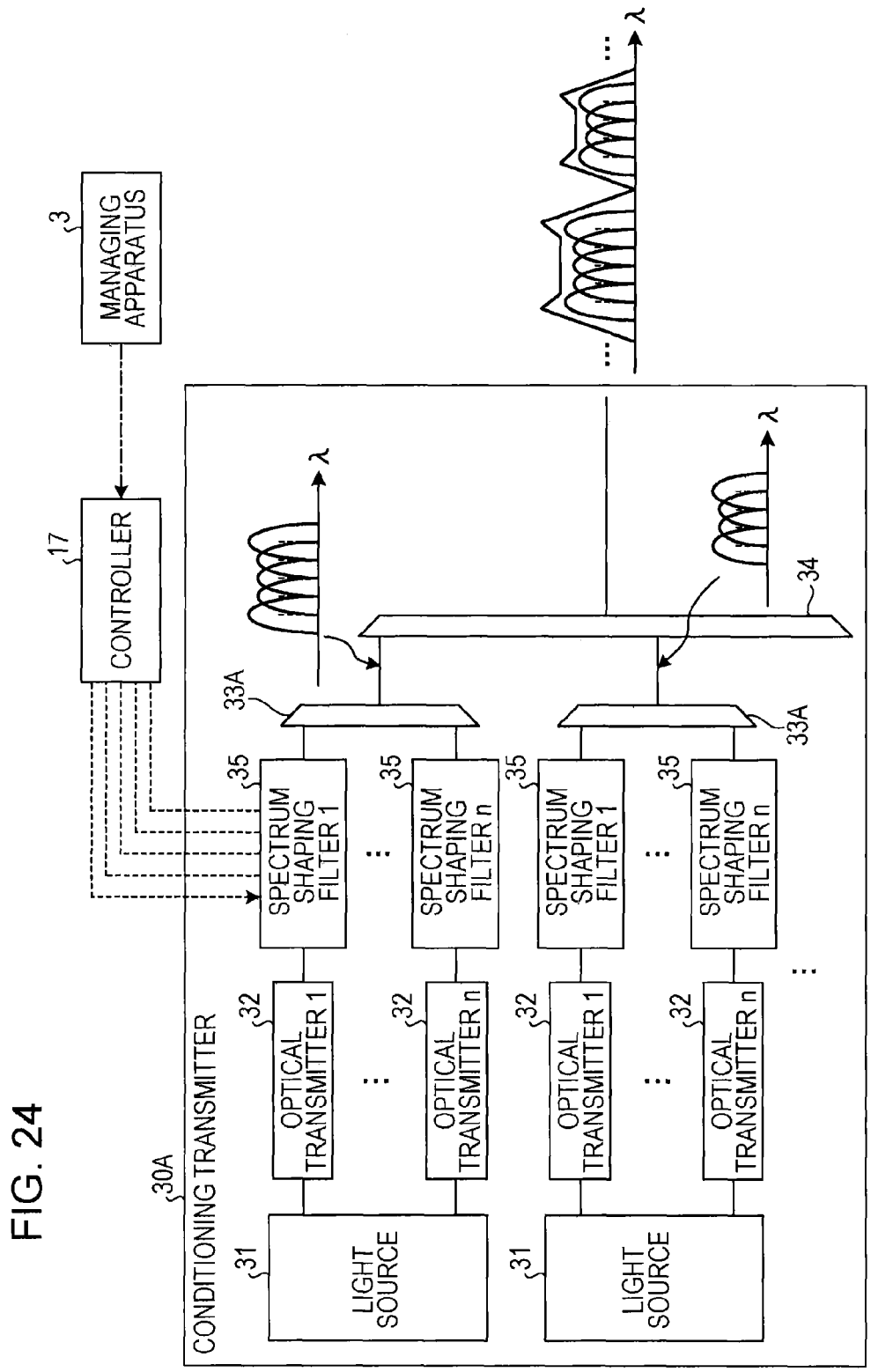
FIG. 24 illustrates an example of a conditioning transmitter in an optical transmission apparatus according to Embodiment 6.
Figure 25:
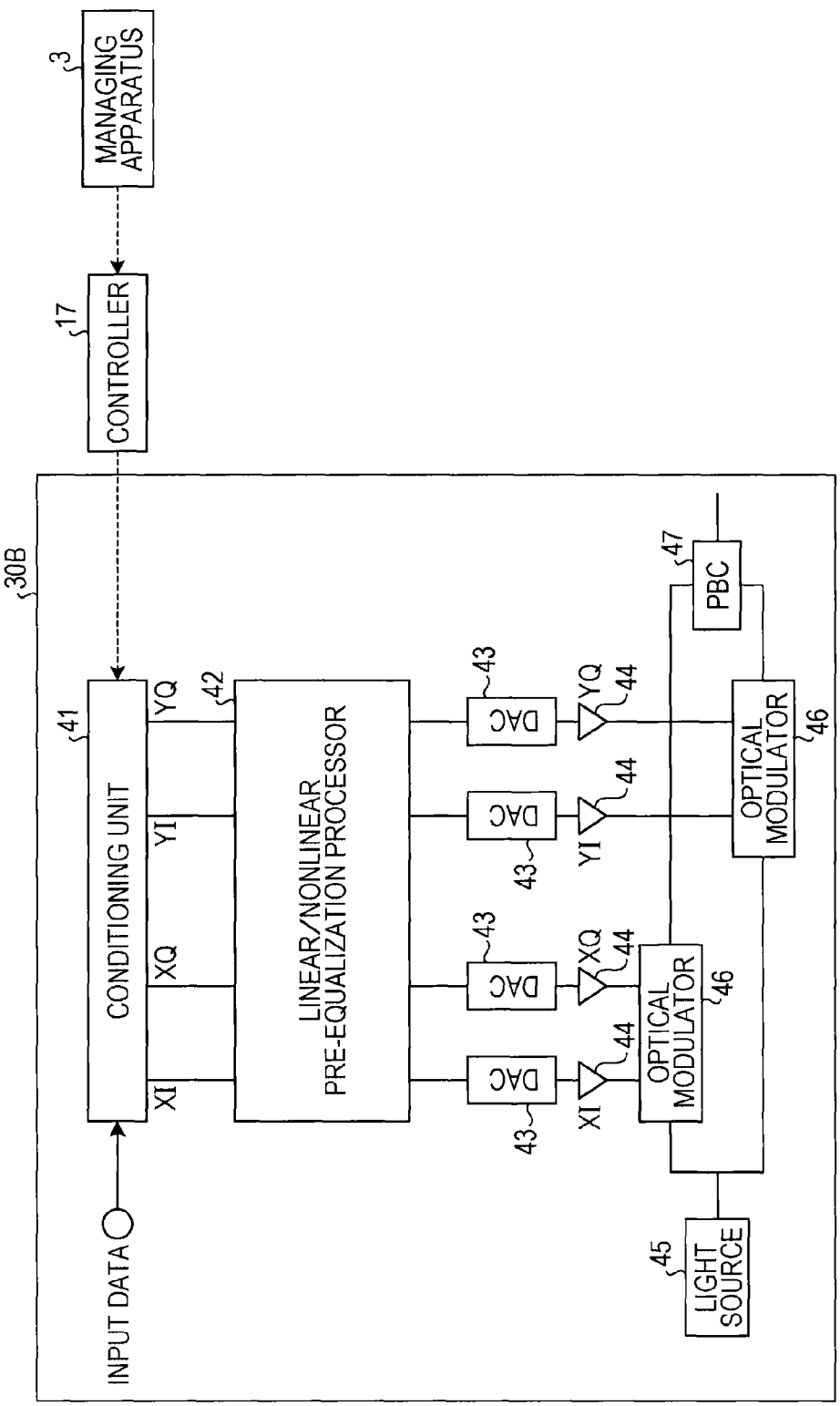
FIG. 25 illustrates an example of a conditioning transmitter in an optical transmission apparatus according to Embodiment 6.

Meanwhile, as described below, the conditioning transmitter 30 may also be modified as illustrated in FIG. 24 or FIG. 25. FIG. 24 illustrates an example of a conditioning transmitter 30 in an optical transmission apparatus 2E according to Embodiment 6. The conditioning transmitter 30A illustrated in FIG. 24 may be configured to include spectrum shaping filters 35 and multiplexers 33A disposed between the optical transmitters 32 and the multiplexer 34. The spectrum shaping filters 35 adjust the gain and phase rotation of subchannel signals transmitted by the optical transmitters 32. The controller 17 adjusts the transmittance of the spectrum shaping filters 35 on the basis of a conditioning level acquired from a managing apparatus 3.

The multiplexers 33A generate superchannel signals by multiplexing subchannel signals that have been adjusted by the spectrum shaping filters 35. In addition, the multiplexer 34 multiplexes the superchannel signals multiplexed by the multiplexers 33A and optically inserts (adds) the multiplexed superchannel signal into the conditioning WSS 15.

Since the conditioning transmitter 30A in FIG. 24 is provided with spectrum shaping filters 35 with built-in conditioning functions disposed at the input of multiplexers 33A configured to generate superchannel signals by multiplexing subchannel signals, the configurable dynamic range may be increased.

FIG. 25 illustrates an example of a conditioning transmitter 30 in an optical transmission apparatus 2E according to Embodiment 6. The conditioning transmitter 30B illustrated in FIG. 25 includes a conditioning unit 41, a linear/non-linear pre-equalization processor 42, digital-to-analog converters (DACs) 43, amplifiers 44, a light source 45, optical modulators 46, and a polarization beam combiner (PBC) 47.

The conditioning unit 41 conditions (adjusts) input data in an electrical signal so as to mitigate spectral narrowing in the edge band portion on both sides of a superchannel signal when transmitted through the conditioning WSS 15. Herein, the conditioning unit 41 is controlled by the controller 17. The linear/non-linear pre-equalization processor 42 executes a linear/non-linear pre-equalization process on input data that has been conditioned by the conditioning unit 41. The DACs 43 take input data that has been processed by the linear/non-linear pre-equalization process, and convert the input data into analog signals.

The amplifiers 44 amplify the analog signals. Additionally, the optical modulators 46 modulate the amplified analog signals by an optical wavelength from the light source 45 to obtain subchannel signals. The PBC 47 combines the subchannel signals from the optical modulators 46. The PBC 47 then optically inserts (adds) the superchannel signal containing the combined subchannel signals into the conditioning WSS 15.

In the conditioning transmitter 30B in FIG. 25, the gain and phase rotation of signals are adjusted before the signals are optically modulated by optical modulators 46. For this reason, the configurable dynamic range may be increased.

Since an optical transmission apparatus 2E according to Embodiment 6 is provided with a conditioning transmitter 30 with built-in conditioning functions, the configurable dynamic range may be increased.

In the above Embodiment 6, it may also be configured such that conditioning functions for adjusting (conditioning) the gain and phase rotation of subchannel signals are provided in the receiver in an optical transmission apparatus 2. A configuration for this case will be hereinafter described as Embodiment 7.

Embodiment 7

Figure 26:
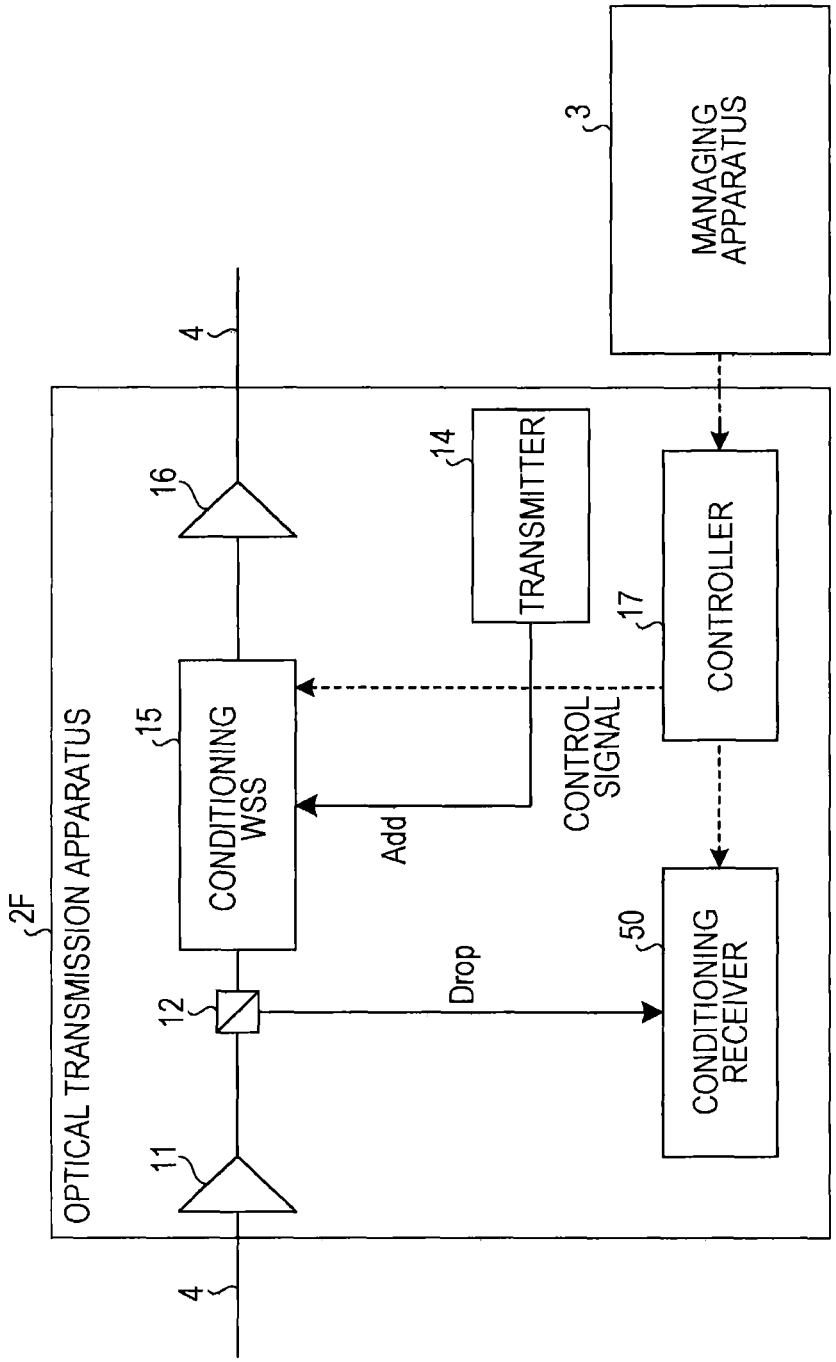
FIG. 26 illustrates an example of an optical transmission apparatus in an optical transmission system according to Embodiment 7.

FIG. 26 illustrates an example of an optical transmission apparatus in an optical transmission system 1 according to Embodiment 7. Herein, like reference signs are given to portions of the configuration which are similar to those of an optical transmission system 1 according to the foregoing embodiments, and duplicate description of the configuration and operation of such portions will be reduced or omitted. The optical transmission apparatus 2F illustrated in FIG. 26 includes a conditioning receiver 50. The conditioning receiver 50 has built-in functions for receiving a superchannel signal that has been optically split by the optical splitter 12, and conditioning functions for adjusting the gain and phase rotation of subchannel signals in a superchannel signal.

The controller 17 adjusts transmittance of the conditioning WSS 15 and the conditioning receiver 50 on the basis of a conditioning level acquired from a managing apparatus 3.

Figure 27:
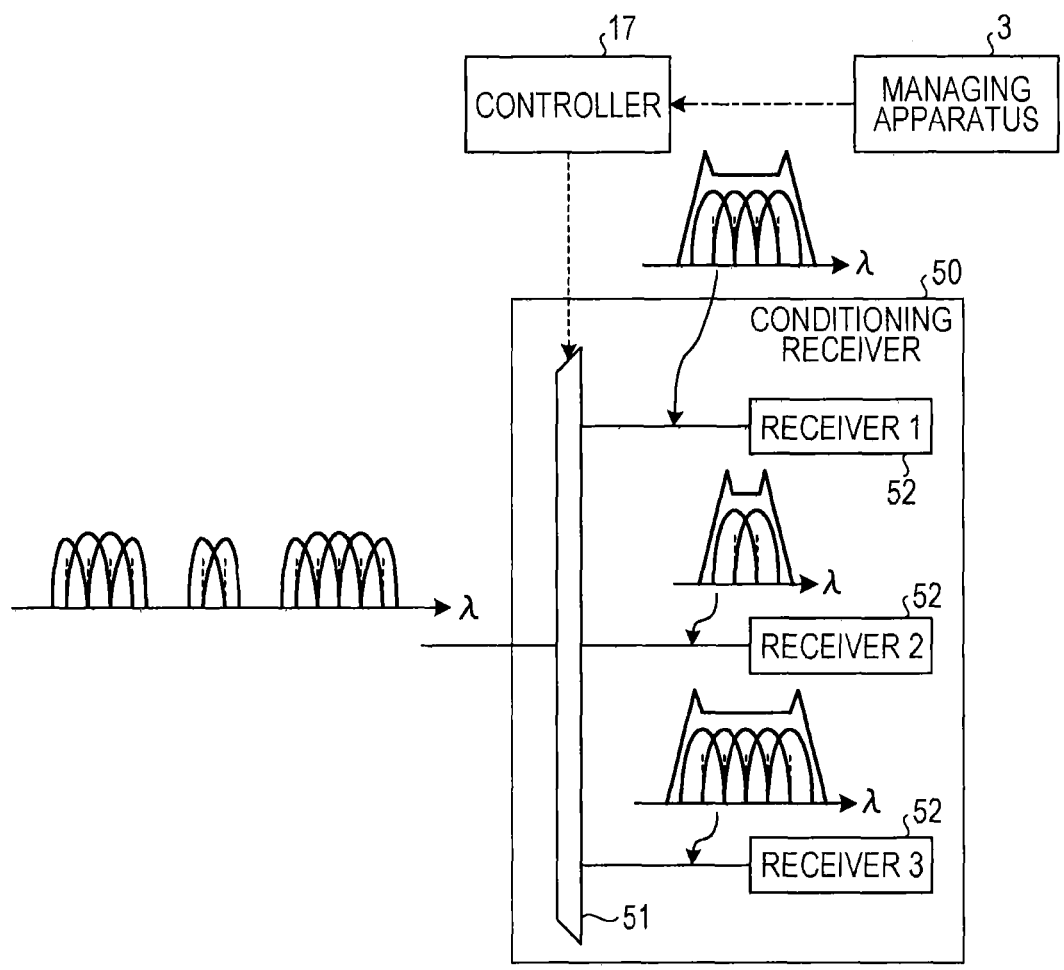
FIG. 27 illustrates an example of a conditioning receiver in an optical transmission apparatus according to Embodiment 7.

FIG. 27 illustrates an example of a conditioning receiver 50 in an optical transmission apparatus 2F according to Embodiment 7. The conditioning receiver 50 illustrated in FIG. 27 includes a conditioning demultiplexer 51 and receivers 52. The conditioning demultiplexer 51 optically separates a plurality of superchannel signals split by the optical splitter 12. Furthermore, the conditioning demultiplexer 51 adjusts the gain and phase rotation of subchannel signals in the edge band portion on both sides of the optically separated superchannel signals. Herein, the conditioning demultiplexer 51 is controlled by the controller 17. The receivers 52 receive the adjusted (conditioned) superchannel signals.

Since the conditioning receiver 50 illustrated in FIG. 27 is provided with a conditioning demultiplexer 51 with built-in conditioning functions configured to separate a plurality of superchannel signals, the configurable dynamic range may be increased.

Figure 28:
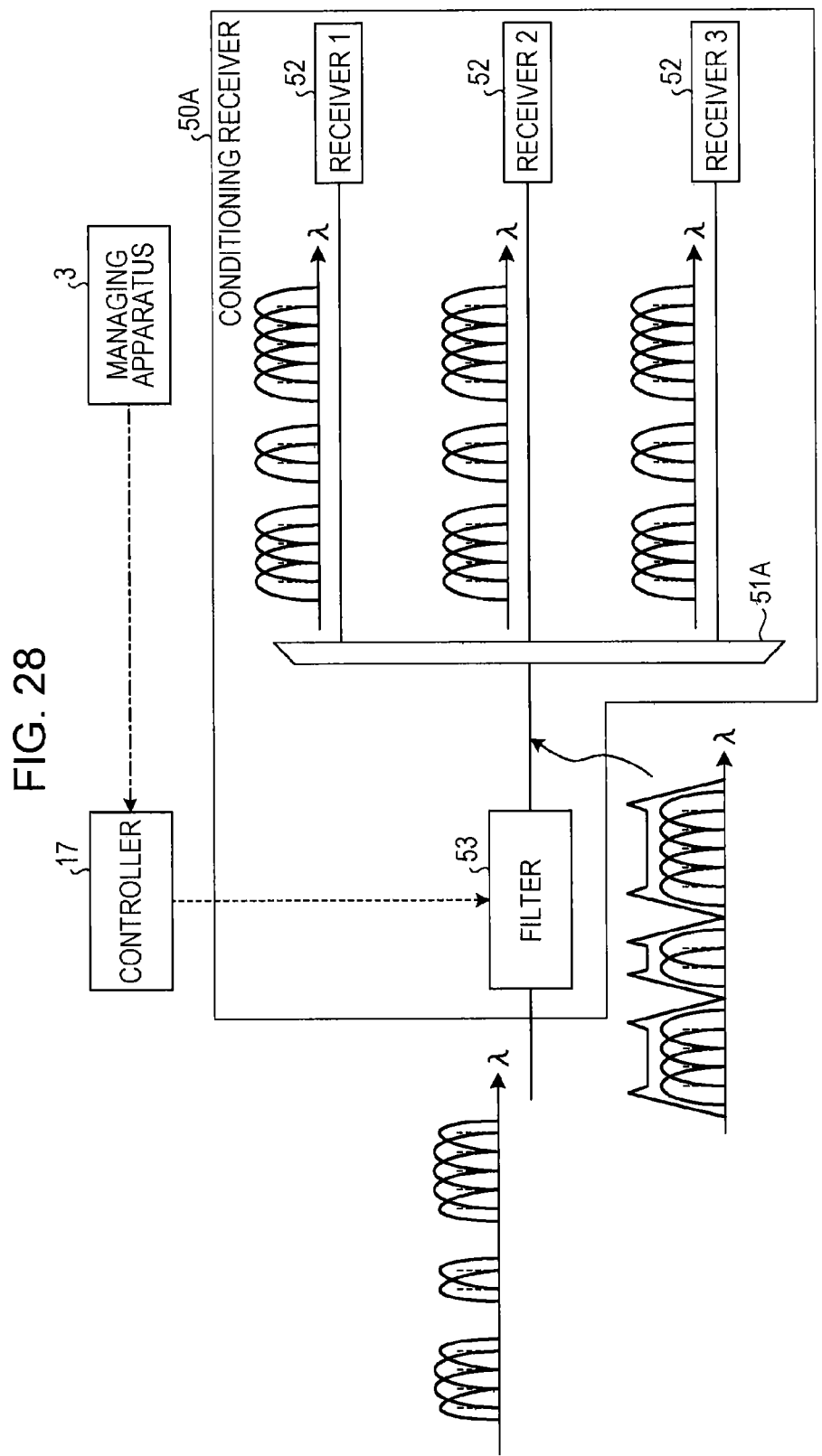
FIG. 28 illustrates an example of a conditioning receiver in an optical transmission apparatus according to Embodiment 7.
Figure 29:
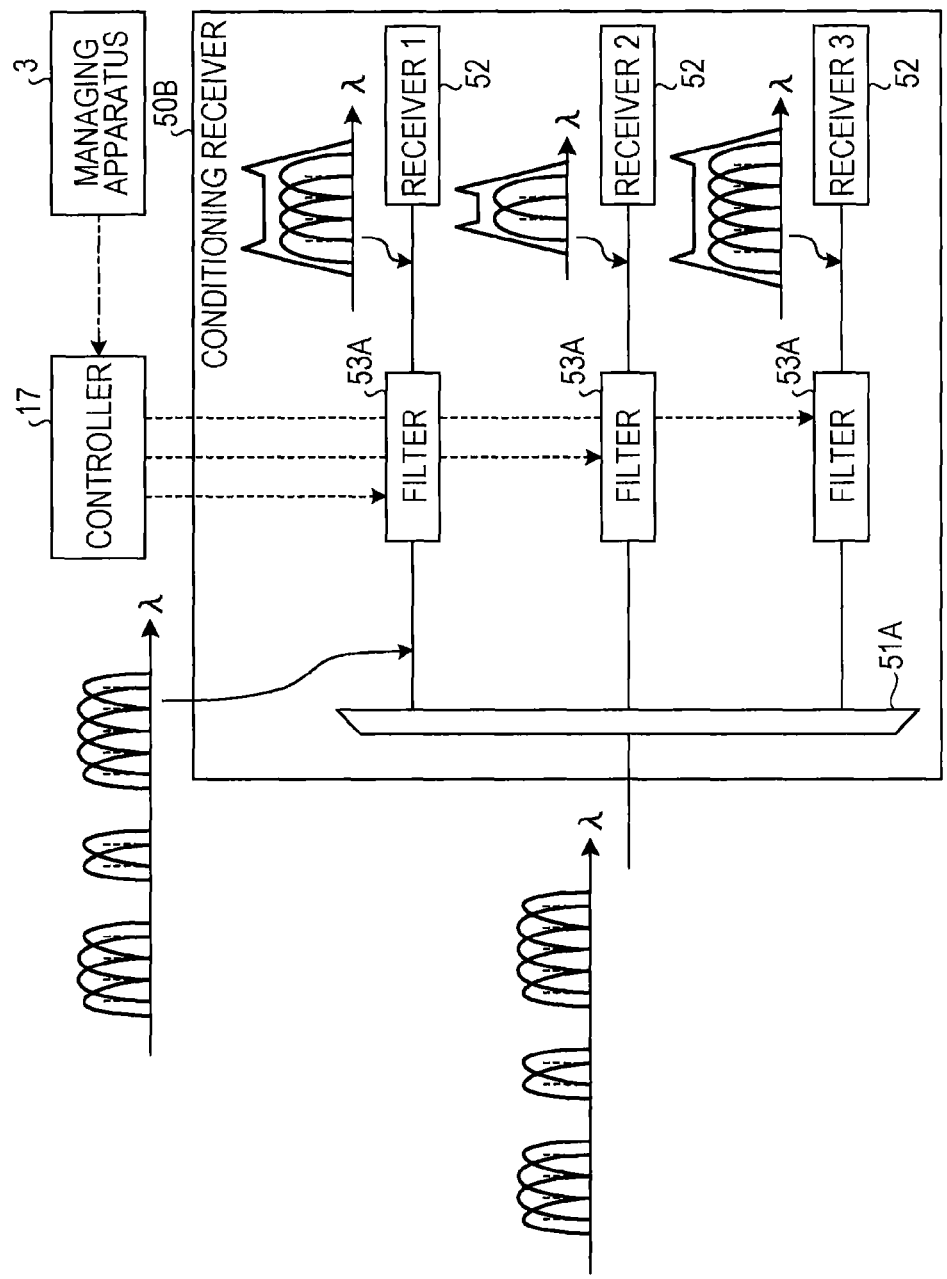
FIG. 29 illustrates an example of a conditioning receiver in an optical transmission apparatus according to Embodiment 7.

Meanwhile, as described below, the conditioning receiver 50 may also be modified as illustrated in FIG. 28 or FIG. 29. FIG. 28 illustrates an example of a conditioning receiver 50 in an optical transmission apparatus 2F according to Embodiment 7. The conditioning receiver 50A illustrated in FIG. 28 includes, in addition to a demultiplexer 51A and receivers 52, a filter 53 provided with conditioning functions and disposed at the input of the demultiplexer 51A. The filter 53 adjusts the attenuation and phase rotation of subchannel signals in a plurality of superchannel signals that have been optically split by the optical splitter 12. Herein, the conditioning receiver 50 is controlled by the controller 17. Subsequently, the demultiplexer 51A separates the plurality of adjusted (conditioned) superchannel signals.

Since the conditioning receiver 50A illustrated in FIG. 28 is provided with a conditioning filter 53 at the input of a demultiplexer 51A configured to separate superchannel signals, the configurable dynamic range may be increased.

Meanwhile, FIG. 29 illustrates an example of a conditioning receiver 50 in an optical transmission apparatus 2F according to Embodiment 7. The conditioning receiver 50B illustrated in FIG. 29 includes, in addition to a demultiplexer 51A and receivers 52, filters 53A provided with conditioning functions and disposed between the demultiplexer 51A and the receivers 52.

The filters 53A adjust the gain and phase rotation of subchannel signals in superchannel signals that have been separated by the demultiplexer 51A. Herein, the conditioning receiver 50 is controlled by the controller 17. The receivers 52 receive superchannel signals that have been adjusted (conditioned) by the filters 53A.

Since the conditioning receiver 50B illustrated in FIG. 29 includes filters 53A provided with conditioning functions and disposed between the demultiplexer 51A and the receivers 52, the configurable dynamic range may be increased.

Since an optical transmission apparatus 2F according to Embodiment 7 is provided with a conditioning receiver 50 with built-in conditioning functions, the configurable dynamic range may be increased.

Although the foregoing embodiments are applied to OFDM superchannel signals, as discussed earlier the embodiments may also be applied to Nyquist-WDM superchannel signals, and additionally to ordinary WDM superchannel signals.

A spectrum detector 20 according to the foregoing embodiments is provided with digital coherent receiver functions. However, the spectrum detector 20 may also be configured to include a variable filter, a photodiode, and a computing unit, for example. In this case, it may be configured such that the computing unit varies the filter band of the variable filter, successively extracts respective subchannel signals in a superchannel signal, and obtains the output of each subchannel signal with the photodiode. The spectrum detector 20 may also be configured to include a dispersive element, a plurality of photodiodes, and a computing unit. In this case, it may be configured such that the computing unit uses the dispersive element to separate subchannel signals in a superchannel signal and obtains the output of the separated subchannel signals.

It is appreciated that the components of the respective units illustrated in the drawings are not limited to being physically configured exactly as configured in the drawings. In other words, the separating or joining of respective units is not limited to that illustrated in the drawings, and all or part thereof may be functionally or physically separated or joined in arbitrary units according to various factors such as load and usage conditions.

Furthermore, all or arbitrary parts of the various processing functions conducted in respective apparatus such as the controller 17, the managing unit 3A, the computing unit 3B, and notifying unit 3C may also be executed in a central processing unit (CPU) or other unit such as a microprocessing unit (MPU) or microcontroller unit (MCU). Obviously, all or arbitrary parts of the various processing functions may also be executed in a program interpreted and executed by a CPU (or other unit such as a MPU or MCU), or executed in hardware by wired logic.

Figure 30:
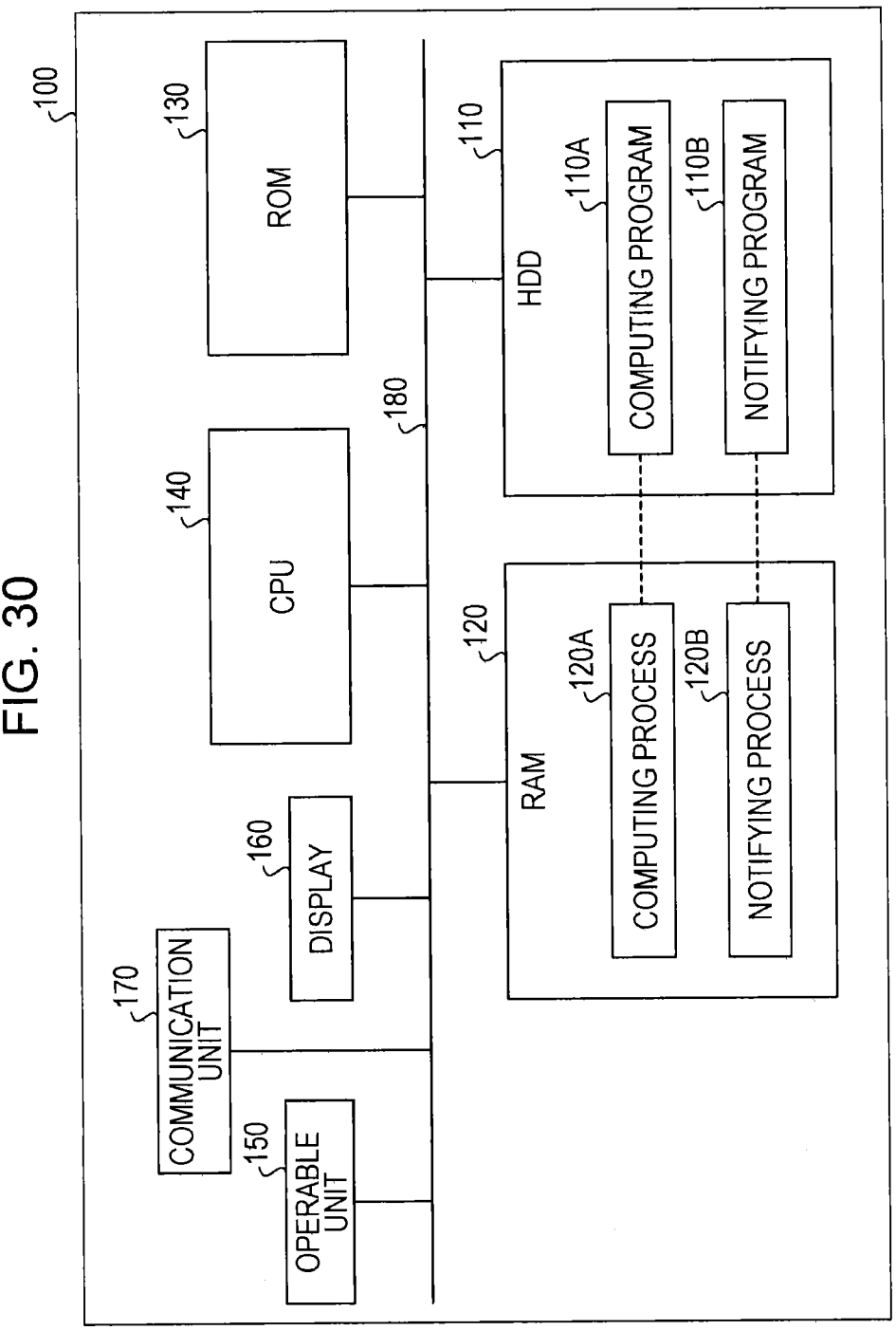
FIG. 30 illustrates an example of a computer that executes a signal conditioning program.
Figure 31:
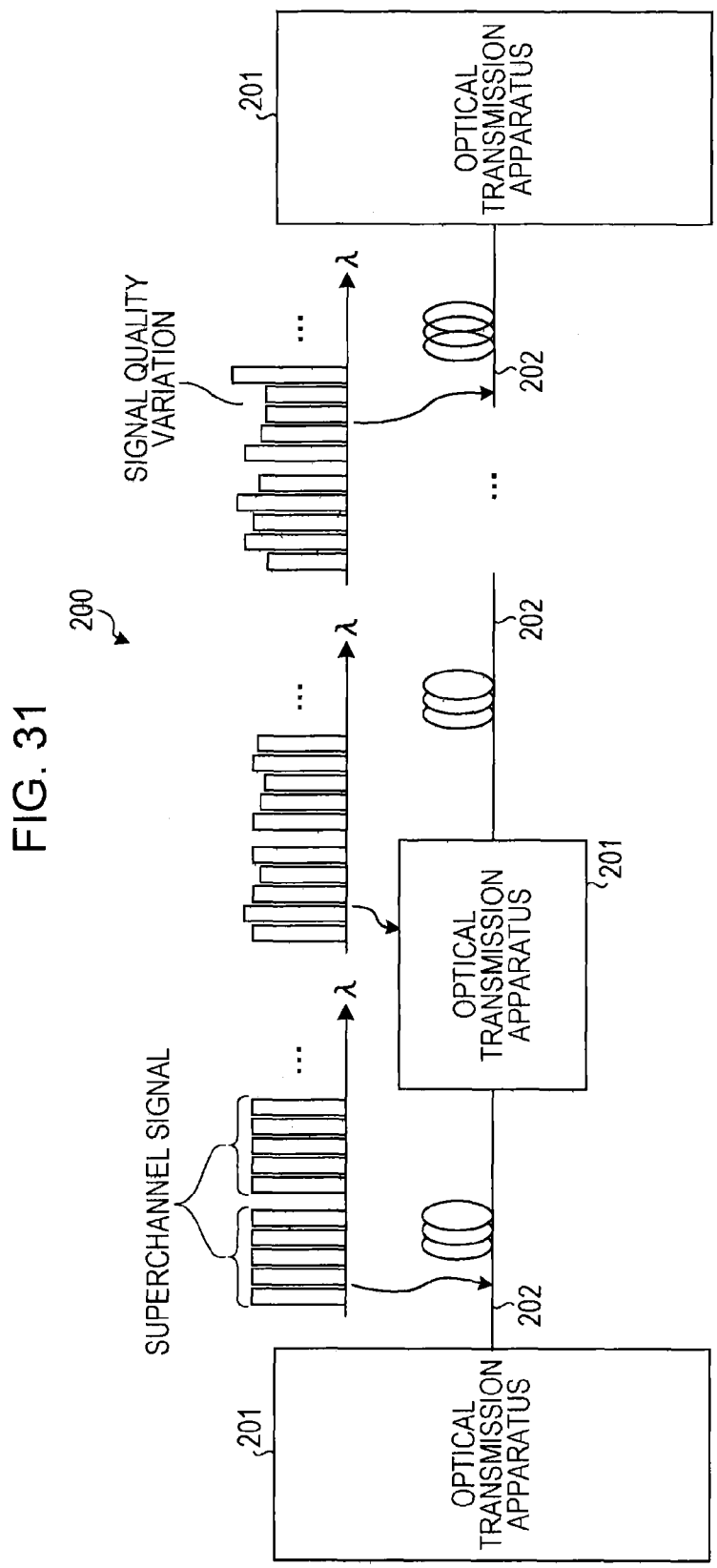
FIG. 31 illustrates an example of signal quality variation occurring along a lightpath.
Figure 32:
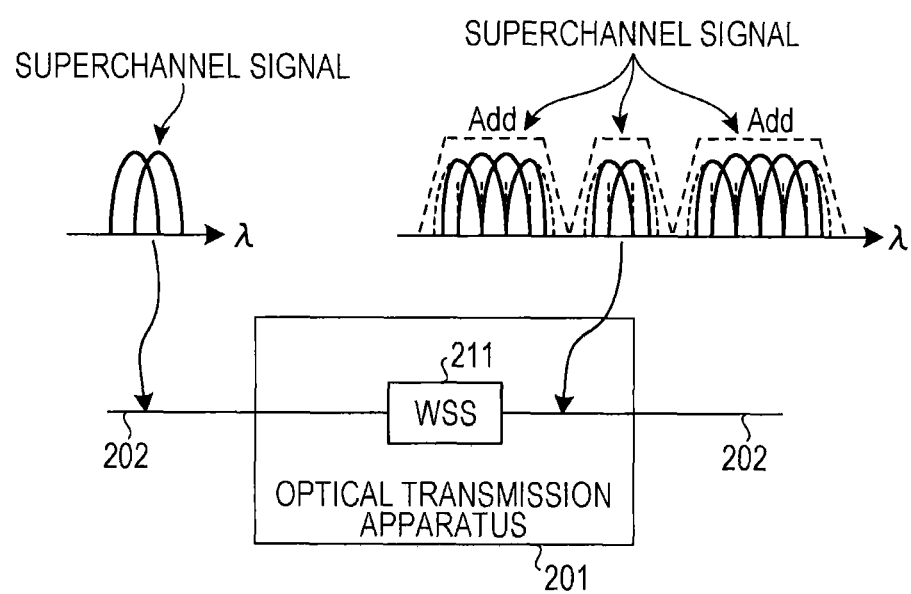
FIG. 32 illustrates an example of narrowing being produced in the edge band portion of a superchannel signal.

Meanwhile, the various processes described in the foregoing embodiments may also be realized by a computer executing a program prepared in advance. Accordingly, an exemplary computer configured to execute a program having functions similar to those of the foregoing embodiments will be hereinafter described. FIG. 30 illustrates an example of a computer that executes a conditioning program.

In FIG. 30, the computer 100 that executes a conditioning program includes a hard disk drive (HDD) 110, random access memory (RAM) 120, read-only memory (ROM) 130, and a CPU 140. Additionally, the computer 100 includes an operable unit 150, a display 160, and a communication unit 170. Also, in the computer 100, the HDD 110, RAM 120, ROM 130, CPU 140, operable unit 150, display 160, and communication unit 170 are connected via a bus 180.

A conditioning program that exhibits functions similar to those of the foregoing embodiments is stored in advance in the HDD 110. An information display program may also be recorded to the ROM 130 or a recording medium that is computer-readable via a drive not illustrated, rather than being stored in the HDD 110. The recording medium may be a portable recording medium such as a CD-ROM, DVD disc, or USB memory, or semiconductor memory such as flash memory, for example. The conditioning program may include a computing program 110A and a notifying program 110B, as illustrated in FIG. 30. Note that the programs 110A and 110B may be joined or separated as appropriate, similarly to the components of the managing apparatus 3 illustrated in FIG. 1.

The CPU 140 reads out the programs 110A and 110B from the HDD 110, and executes them in the RAM 120. As illustrated in FIG. 30, the programs 110A and 110B respectively function as a computing process 120A and a notifying process 120B in the RAM 120.

The HDD 110 stores system information for each optical transmission apparatus in an optical transmission system. On the basis of system information in the HDD 110, the CPU 140 computes conditioning levels used to adjust conditioning units in the optical transmission apparatus, such that the optical intensity differential among channels in wavelength-division multiplexed light adjusted and output from the conditioning unit in an optical transmission apparatus does not exceed a reference threshold. Additionally, the CPU 140 respectively notifies the optical transmission apparatus of the computed conditioning levels. As a result, an optical transmission apparatus adjusts its conditioning unit on the basis of a conditioning level from the computer 100, and thus the transmission quality of wavelength-division multiplexed light thus adjusted and output may be improved.

The optical transmission apparatus (2, 2A, 2B, 2C, 2D, 2E, and 2F) may further include a plurality of receivers 13 and/or a plurality of transmitters 14.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system, comprising:
   optical transmission apparatuses configured to transmit wavelength-division multiplexed light signals via lightpaths, each of a pair of optical transmission apparatuses includes a conditioning unit configured to adjust the optical intensities of channels included in the wavelength-division multiplexed light signal, and one or more first processors configured to control, based on a notified conditioning level, the conditioning unit; and
   a managing apparatus configured to manage the pair of the optical transmission apparatuses, the managing apparatus including one or more second processors configured to compute a conditioning level on a basis of system information for a respective pair of the optical transmission apparatuses in the optical transmission system, such that an optical intensity differential among a plurality of subchannels in the wavelength-division multiplexed light signal that has been adjusted and output from the conditioning unit in an optical transmission apparatus does not exceed a reference threshold in a superchannel signal output from the conditioning unit, and notify the pair of the optical transmission apparatuses of the computed conditioning level, wherein the optical transmission apparatuses adjust transmittance of the conditioning unit based on the computed conditioning level, wherein the superchannel signal comprises the plurality of subchannels that are multiplexed, wherein the one or more second processors compute the conditioning level such that the transmittance of the conditioning unit in the center band of the wavelength-division multiplexed light signal are decreased to less than the transmittance of the conditioning unit in the edge band of the wavelength-division multiplexed light signal.

2. The optical transmission system according to claim 1, wherein the system information includes, for the pair of the optical transmission apparatuses, a reference conditioning level and conditioning adjustment values which depend on a number of hops through which the wavelength-division multiplexed light signal has passed, and the one or more second processors compute the conditioning level on a basis of the reference conditioning level and the conditioning adjustment values which depend on the number of hops.

3. The optical transmission system according to claim 1, wherein the one or more second processors compute, as the conditioning level, the attenuation by which the optical intensity attenuates in individual channels of the wavelength-division multiplexed light signal.

4. The optical transmission system according to claim 1, wherein the conditioning unit adjusts the phase in individual channels of the wavelength-division multiplexed light signal, and the one or more second processors compute, as the conditioning level, a phase rotation by which to shift the phase of individual channels in the wavelength-division multiplexed light signal, such that the phase differential among channels in the wavelength-division multiplexed light signal does not exceed a reference threshold.

5. The optical transmission system according to claim 1, wherein the optical transmission apparatus further includes a detector configured to detect spectral information regarding the wavelength-division multiplexed light signal, and wherein the one or more first processors correct the conditioning level on a basis of spectral information detected by the detector, such that the wavelength-division multiplexed light signal does not exceed a reference threshold.

6. The optical transmission system according to claim 5, wherein the one or more first processors compute an optical intensity differential between channels in the center band of the wavelength-division multiplexed light signal and channels in bands other than the center band of the conditioning level, and correct the conditioning level such that the computed optical intensity differential does not exceed a reference threshold.

7. The optical transmission system according to claim 5, wherein the one or more first processors compute an average optical intensity for channels in the wavelength-division multiplexed light signal, compute the differential between the optical intensities of channels against the computed average optical intensity, and correct the conditioning level such that the computed optical intensity differential does not exceed a reference threshold.

8. The optical transmission system according to claim 5, wherein the one or more first processors compute an optical intensity differential among the plurality of subchannels in the wavelength-division multiplexed light signal, and correct the conditioning level such that the computed optical intensity differential does not exceed a reference threshold.

9. The optical transmission system according to claim 5, wherein the one or more first processors compute an phase rotation differential among subchannels in the wavelength-division multiplexed light signal, and correct the conditioning level such that the computed phase rotation differential does not exceed a reference threshold.

10. The optical transmission system according to claim 1, wherein each of the pair of the optical transmission apparatuses further includes a detector configured to detect spectral information regarding the wavelength-division multiplexed light signal, and wherein the one or more first processors correct the conditioning level on a basis of spectral information detected by the detector, such that the optical intensity differential among the plurality of subchannels in the wavelength-division multiplexed light signal does not exceed a reference threshold.

11. The optical transmission system according to claim 1, wherein each of the pair of the optical transmission apparatuses further includes a first detector disposed at the input of the conditioning unit and configured to detect spectral information regarding the wavelength-division multiplexed light signal, and a second detector disposed at the output of the conditioning unit and configured to detect spectral information regarding the wavelength-division multiplexed light signal, and wherein the one or more first processors correct the conditioning level on a basis of spectral information regarding the wavelength-division multiplexed light signal detected by the first detector or the second detector, such that the optical intensity differential among the plurality of subchannels in the wavelength-division multiplexed light signal does not exceed a reference threshold.

12. The optical transmission system according to claim 1, wherein each of the pair of the optical transmission apparatuses further includes a receiver configured to receive the wavelength-division multiplexed light signal via the lightpaths, the receiver including a detector configured to detect spectral information regarding the wavelength-division multiplexed light signal, and a notifying unit configured to notify upstream optical transmission apparatus that transmitted the wavelength-division multiplexed light signal of the spectral information detected by the detector, and when spectral information is received from a downstream optical transmission apparatus, the one or more first processors correct the conditioning level on a basis of the spectral information, such that the optical intensity differential among the plurality of subchannels in the wavelength-division multiplexed light signal does not exceed a reference threshold.

13. The optical transmission system according to claim 1, wherein each of the pair of the optical transmission apparatuses further includes a transmitter configured to transmit wavelength-division multiplexed light signal over the lightpaths, the transmitter including a conditioning unit configured to adjust the wavelength-division multiplexed light signal such that the optical intensity differential among the plurality of subchannels in the wavelength-division multiplexed light signal does not exceed a reference threshold, and wherein the wavelength-division multiplexed light signal that has been adjusted by the conditioning unit is output and transmitted over the lightpaths.

14. The optical transmission system according to claim 1, wherein each of the pair of the optical transmission apparatus further includes a receiver configured to receive the wavelength-division multiplexed light signal over the lightpaths, the receiver including a conditioning unit configured to adjust the wavelength-division multiplexed light signal such that the optical intensity differential among the plurality of subchannels in the wavelength-division multiplexed light signal does not exceed a reference threshold, and wherein the wavelength-division multiplexed light signal that has been adjusted by the conditioning unit is received and output.

15. The optical transmission system according to of claim 1, wherein the wavelength-division multiplexed light signal includes a superchannel signal in which a plurality of subchannels are multiplexed which are treated as a single signal.

16. An optical transmission apparatus configured to transmit wavelength-division multiplexed light signal via a lightpath, comprising:

a conditioning unit configured to adjust the optical intensities of channels in the wavelength-division multiplexed light signal;

one or more first processors configured to detect a conditioning level used to perform conditioning such that the optical intensity differential among a plurality of subchannels in the wavelength-division multiplexed light signal does not exceed a reference threshold in a superchannel signal output from the conditioning unit, and to control the conditioning unit on a basis of the conditioning level; and adjusting transmittance of the conditioning unit based on the conditioning level, wherein the superchannel signal comprises the plurality of subchannels that are multiplexed, wherein the one or more first processors detect the conditioning level with the transmittance of the conditioning unit in the center band of the wavelength-division multiplexed light signal are decreased to less than the transmittance of the conditioning unit in the edge band of the wavelength-division multiplexed light signal.

17. The optical transmission apparatus according to claim 16, further comprising:

a detector configured to detect spectral information regarding the wavelength-division multiplexed light signal, wherein the first processors correct the conditioning level on a basis of spectral information detected by the detector, such that the optical intensity differential among the plurality of subchannels in the wavelength-division multiplexed light signal does not exceed a reference threshold.

18. A computer-readable recording medium having stored therein a program for causing a computer to execute a digital signal process comprising:

computing a conditioning level used to adjust an output from an optical transmission apparatus on a basis of system information for an optical transmission apparatus, such that an optical intensity differential among a plurality of subchannels in a wavelength-division multiplexed light signal that has been adjusted and output from a conditioning unit in an optical transmission apparatus does not exceed a reference threshold in a superchannel signal output from the conditioning unit;

notifying the optical transmission apparatus of the computed conditioning level; and adjusting transmittance of the conditioning unit based on the computed conditioning level, wherein the superchannel signal comprises the plurality of subchannels that are multiplexed, wherein the conditioning level is computed such that the transmittance of the conditioning unit in the center band of the wavelength-division multiplexed light signal are decreased to less than the transmittance of the conditioning unit in the edge band of the wavelength-division multiplexed light signal.

19. A signal conditioning method conducted in an optical transmission system that includes optical transmission apparatus configured to transmit wavelength-division multiplexed light signal via lightpaths and a managing apparatus configured to manage the optical transmission apparatus, the signal conditioning method comprising:

causing the managing apparatus to compute a conditioning level used to adjust a conditioning unit in the optical transmission apparatus on a basis of system information for individual optical transmission apparatus in the optical transmission system, such that an optical intensity differential among a plurality of subchannels in the wavelength-division multiplexed light signal that has been adjusted and output from the conditioning unit in an optical transmission apparatus does not exceed a reference threshold in a superchannel signal output from the conditioning unit, and to notify the optical transmission apparatus of the computed conditioning level; and causing an optical transmission apparatus to control its conditioning unit so as to adjust the optical intensity in respective channels of the wavelength-division multiplexed light signal on a basis of the conditioning level from the managing apparatus, wherein the optical transmission apparatus adjusts transmittance of the conditioning unit based on the computed conditioning level, wherein the superchannel signal comprises the plurality of subchannels that are multiplexed, wherein the managing apparatus computes the conditioning level such that the transmittance of the conditioning unit in the center band of the wavelength-division multiplexed light signal are decreased to less than the transmittance of the conditioning unit in the edge band of the wavelength-division multiplexed light signal.

* * * * *